(12) United States Patent
Yoshimura

(10) Patent No.: US 8,169,663 B2
(45) Date of Patent: May 1, 2012

(54) IMAGE PROCESSING SYSTEM AND METHOD FOR QUANTIZING AN IMAGE BY USING AN ERROR DIFFUSION METHOD

(75) Inventor: Hideyoshi Yoshimura, Yamatokoriyama (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 571 days.

(21) Appl. No.: 12/410,710

(22) Filed: Mar. 25, 2009

(65) Prior Publication Data

US 2009/0244632 A1 Oct. 1, 2009

(30) Foreign Application Priority Data

Mar. 28, 2008 (JP) .................................. 2008-088023

(51) Int. Cl.
*H04N 1/40* (2006.01)
(52) U.S. Cl. ...................... 358/3.03; 358/3.05; 358/3.06; 358/1.9; 358/3.22; 358/3.26; 382/252
(58) Field of Classification Search .................. None
See application file for complete search history.

(56) References Cited

U.S. PATENT DOCUMENTS

| | | | | |
|---|---|---|---|---|
| 5,317,653 A * | 5/1994 | Eschbach et al. | ............. | 382/252 |
| 5,748,336 A * | 5/1998 | Kakutani | ................. | 382/252 |
| 6,608,941 B1 | 8/2003 | Suzuki et al. | | |
| 6,614,556 B1 * | 9/2003 | Hong et al. | ................. | 358/3.03 |
| 7,224,487 B2 * | 5/2007 | Gupta et al. | ................. | 358/3.05 |
| 7,301,673 B2 * | 11/2007 | Kang | ......................... | 358/3.03 |
| 7,420,708 B2 * | 9/2008 | Mantell | ...................... | 358/3.03 |
| 7,463,387 B2 * | 12/2008 | Hagai et al. | ................. | 358/3.03 |
| 7,660,016 B2 * | 2/2010 | Ike et al. | ...................... | 358/3.05 |
| 7,711,194 B2 * | 5/2010 | Liao et al. | .................... | 382/232 |
| 2004/0174569 A1 * | 9/2004 | Karito | ......................... | 358/3.01 |
| 2004/0179240 A1 * | 9/2004 | Lee | ............................. | 358/3.05 |
| 2007/0153333 A1 * | 7/2007 | Kakutani | ..................... | 358/3.13 |
| 2008/0031536 A1 * | 2/2008 | Liao et al. | .................... | 382/251 |
| 2009/0251736 A1 * | 10/2009 | Kawamura | ................... | 358/3.03 |

FOREIGN PATENT DOCUMENTS

JP 2003-23540 A 1/2003

OTHER PUBLICATIONS

Kakutani, T. et al. "Threshold Control Technique for Error Diffusion Method", Denshi Shashin Gakkaishi (Electrophotograpy) vol. 37, 1998, No. 2, pp. 50-56.

* cited by examiner

*Primary Examiner* — King Poon
*Assistant Examiner* — Dung Tran
(74) *Attorney, Agent, or Firm* — Birch, Stewart, Kolasch & Birch, LLP

(57) ABSTRACT

An image processing apparatus includes (i) a repulsive force generating section for setting repulsive force values RVa and RVu of a quantized pixel according to an output pixel value of the quantized pixel, (ii) a repulsive force calculating section for calculating a repulsive force value RVC to be used in quantizing a quantization-target pixel by attenuating, according to a distance between the quantized pixel and the quantization-target pixel, the repulsive force values RVa and RVu set for the quantized pixel; and (iii) a threshold value correcting section for correcting a threshold value T used in quantizing the quantization-target pixel according to the repulsive force value RVC. This makes it possible to prevent an increase in the number of processing steps and amount of processing when an image is processed with an error diffusion method. At the same time, it is possible to prevent decrease in image uniformity and formation of a pattern unique to the error diffusion method.

11 Claims, 13 Drawing Sheets

FIG. 6

| | 60 | 56 | 52 | 48 |
|---|---|---|---|---|
| 60 | 0 | 0 | 0 | 0 |
| 56 | 0 | 48 | 44 | 40 |
| 52 | 0 | 44 | 40 | 36 |
| 48 | 0 | 40 | 36 | 32 |

| | 60 | 56 | 52 | 48 |
|---|---|---|---|---|
| 60 | 0 | 0 | 0 | 0 |
| 56 | 0 | 0 | 0 | 0 |
| 52 | 0 | 0 | 0 | 0 |
| 48 | 0 | 0 | 0 | 0 |

IMAGE PROCESSING SYSTEM AND METHOD FOR QUANTIZING AN IMAGE BY USING AN ERROR DIFFUSION METHOD

This Nonprovisional application claims priority under 35 U.S.C. §119(a) on Patent Application No. 2008-088023 filed in Japan on Mar. 28, 2008, the entire contents of which are hereby incorporated by reference.

TECHNICAL FIELD

The present invention relates to an image processing apparatus and image processing method for carrying out halftoning (tone reproduction) by using an error diffusion method.

BACKGROUND ART

In an optical input device (image input apparatus) such as a scanner and a digital camera, light collected through a lens is photoelectrically converted into an electric signal by an image sensing element, a capture image is A/D (Analog/Digital) converted into digital data, and then an image corresponding to the digital data is outputted to an output device (image output apparatus) such as a display and a printer. During the processes before the image output, some imaging processings, such as converting an image processing mode according to the output device, are carried out in combination. The image sensing element can be a CCD (Charge Coupled Apparatus) image sensor, a CMOS (Complementary Metal Oxide Semiconductor) image sensor, a CIS (Contact Image Sensor), or the like, for example.

For example, Patent Literature 1 (Japanese Patent No. 3472479, publication date: Dec. 10, 1999) discloses a device called multifunction printer or digital copying machine, including an inkjet or laser printer (image output apparatus) and a scanner (image input apparatus) that uses a one-dimensional line CCD sensor as an image sensing element. In this device, multi-valued image data having been subjected to various image processings is subjected to a halftone output processing for quasi-tone reproduction in such a grey level that is reproducible in the image output apparatus. Thereafter, the data thus processed is outputted to the image output apparatus.

In general, the halftone output processing is carried out by using a dither method or an error diffusion method. The error diffusion method is one of random dither methods and is for binarizing a quantization-target pixel with a certain threshold value by adding, to the quantization-target pixel, a difference between a binarized image and its original image at a binarized pixel that is located in the vicinity of the quantization-target pixel and has been already binarized, which difference is weighted according to a distance between the quantization-target pixel and the binarized pixel. With the error diffusion method, a local average error in the binarized image is reduced as small as possible.

FIG. 12 is a view illustrating an error diffusion method used in a conventional image processing apparatus. FIG. 12 exemplifies a case where an input image is a single plane image expressed in 8 bits. FIG. 13 is a flow diagram illustrating processes of an error diffusion method carried out in a conventional image processing apparatus.

As shown in FIG. 13, in a conventional error diffusion method, a quantization-target pixel (x, y) is quantized at first (S10).

In a case of binary quatization, for example, a pixel value P(x, y) of the quantization-target pixel (x, y) is compared to a threshold value V. A quantization value O(x, y) is represented by OU when the pixel value P(x, y) is equal to or more than the threshold value V, and is represented by OD when the pixel value P is less than the threshold value V. For example, the threshold value V can be 128, the quantization value OD can be 0, and the quantization value OU can be 255.

In a case of four-valued quantization, the pixel value P(x, y) of the quantization-target pixel (x, y) is compared to threshold values T0, T1, and T2, respectively, so that the quantization value O(x, y) is represented by either O0, O1, O2, or O3 in accordance with conditions determined in advance as shown in Table 1. For example, the threshold values T0, T1, and T2 can be 43, 128, and 213, respectively, and the quantization values O0, O1, O2, and O3 can be 0, 85, 170, and 255, respectively.

TABLE 1

| Selection condition of quantization value | Quantization value Q |
|---|---|
| P (x, y) < T0 | Q0 |
| T0 ≤ P (x, y) < T1 | Q1 |
| T1 ≤ P (x, y) < T2 | Q2 |
| T2 ≤ P (x, y) | Q3 |

Next, a quantization error is calculated (S11). A quantization error Qerr is calculated with Equation (1):

$$Qerr(x,y)=P(x,y)-O(x,y) \quad \text{Equation (1)}.$$

Then, diffusion errors are calculated (S12). For example, diffusion errors DEa(x, y), DEb(x, y), DEc(x, y), and DEd(x, y) to be applied to respective neighboring pixels (x+1, y), (x−1, y+1), (x, y+1), and (x+1, y+1) shown in FIG. 12 are calculated with Equations (2) through (5), respectively, by using diffusion coefficients shown in FIG. 12:

$$DEa(x,y)=Qerr(x,y)\times\tfrac{1}{2} \quad \text{Equation (2)},$$

$$DEb(x,y)=Qerr(x,y)\times\tfrac{1}{8} \quad \text{Equation (3)},$$

$$DEc(x,y)=Qerr(x,y)\times\tfrac{1}{4} \quad \text{Equation (4)},$$

$$DEd(x,y)=Qerr(x,y)\times\tfrac{1}{8} \quad \text{Equation (5)}.$$

Then, error addition is carried out (S13). In the error addition, as shown in Equations (6) through (9), the diffusion errors calculated in the step S12 are spread (added) to each of the neighboring pixels that have not been quantized:

$$P(x+1,y)=P(x+1,y)+DEa(x,y) \quad \text{Equation (6)},$$

$$P(x-1,y+1)=P(x-1,y+1)+DEb(x,y) \quad \text{Equation (7)},$$

$$P(x,y+1)=P(x,y+1)+DEc(x,y) \quad \text{Equation (8)},$$

$$P(x+1,y+1)=P(x+1,y+1)+DEd(x,y) \quad \text{Equation (9)}.$$

By repeating the steps S10 through S13 in each pixel in a raster order from upper left pixels to lower right pixels, it is possible to output an image reproduced in a certain quantization tone (in this case, 2 tones and 4 tones, for example) from 8 bit input tone. When an input image includes a plurality of color planes (color components), the above-mentioned processes are carried out with respect to each of the color planes, so that it becomes possible to output an image reproduced in a certain quantization tone from the input image expressed in each tone of the color planes.

In general, the tone reproduction using the error diffusion method has the following problems: (1) rising of an output dot is more likely to delay in a high-brightness region (low-density region); and (2) a pattern (texture) unique to the error diffusion is easy to see particularly in a region of high brightness and few tone changes.

For the purpose of solving the problems above, such a method is widely used that a random noise or high-frequency noise (blue noise) is added to input data or a threshold value used in quantization. For example, Non Patent Literature 1 ("Threshold control technique for error diffusion method" Toshiaki KAKUTANI, DENSHI SHASHIN GAKKAISHI (Electrophotography), Vol. 37 (1998) No. 2, pp. 186-192) describes (i) noise application to a threshold value and (ii) an error diffusion method based on threshold optimization.

With the method of Non Patent Literature 1, it is possible to reduce the problems (1) and (2) above. However, there arises the other problem (3) that noise addition to a large region of few tone changes causes a reduction in uniformity depending on a dynamic range of the noise to be added. That is to say, a technique for adding noise to a threshold value cannot solve both of the problems (2) and (3), which trade off with each other in regard to image quality.

In order to solve the problems (2) and (3), Patent Literature 2 (Japanese Unexamined Patent Publication, Tokukai No. 2003-23540, publication date: Jan. 24, 2003) discloses a technique for spatially equalizing a dot occurrence ratio by (i) detecting a neighboring pixel that has been quantized and forms a dot within a predetermined range from a quantization-target pixel of an input image signal to be quantized, and then by (ii) suppressing a dot formation at a position of the quantization-target pixel based on a density of the neighboring pixel before quantization, a density of the quantization-target pixel, and a distance between the quantization-target pixel and the neighboring pixel.

However, with the technique of Patent Literature 2, it is necessary to carry out, in each quantization of pixels, (i) detecting the neighboring pixel that forms a dot, by sequentially scanning quantized neighboring pixels within the predetermined range of distance from the quantization-target pixel to be quantized, (ii) finding pre-quantization densities of all of the detected neighboring pixels, (iii) calculating a distance between the quantization-target pixel and each of the detected neighboring pixels, (iv) detecting a density of the quantization-target pixel, and (v) determining whether to suppress a dot formation at the position of the quantization-target pixel based on the pre-quantization densities of all of the detected neighboring pixels, the density of the quantization-target pixel, and the distance between the quantization-target pixel and each of the detected neighboring pixels.

Therefore, the technique of Patent Literature 2 requires a larger number of processing steps and a larger amount of processing than a normal error diffusion method, thereby causing a problem of large processing load. Further, determining whether to suppress the dot formation uses the pre-quantization densities of all of the detected neighboring pixels. Therefore, it is necessary to provide storage means for storing pre-quantization image data.

SUMMARY OF THE INVENTION

The present invention has been accomplished in view of the problems above, and an object of the present invention is to prevent, when processing an image by an error diffusion method, reduction in image uniformity and formation of pattern unique to the error diffusion method, as well as preventing an increase in the number of processing steps and amount of processing.

In order to attain the object, an image processing apparatus of the present invention is an image processing apparatus for scanning each pixel of an input image data in a raster order so as to quantize a multi-valued input pixel signal of said each pixel by using an error diffusion method, the image processing apparatus including: an error adding section for calculating an additional value by adding an input pixel value of a quantization-target pixel to a diffusion error diffused from a quantized pixel; a quantizing section for calculating an output pixel value of the quantization-target pixel by quantizing the quantization-target pixel based on a result of comparison between the additional value and a threshold value; an error calculating section for calculating a quantization error based on the input pixel value, the additional value, and the output pixel value obtained by the quantization of the quantization-target pixel; a diffusion error calculating section for calculating a diffusion error to be diffused to a non-quantized pixel based on the quantization error and a positional relation between the quantization-target pixel and the non-quantized pixel; an adjustment standard value generating section for setting an adjustment standard value for every quantization-target pixel according to the output pixel value of the quantization-target pixel, the adjustment standard value providing a standard of correction of the additional value or the threshold value at a time of quantization of the non-quantized pixel; an adjustment value calculating section for calculating an adjustment value to be used in quantizing the quantization-target pixel, the adjustment value calculating section calculating the adjustment value by attenuating, according to a distance between the quantized pixel and the quantization-target pixel, the adjustment standard value set for the quantized pixel; and a threshold value correcting section for correcting, based on the adjustment value, the threshold value or the additional value used in quantizing the quantization-target pixel.

In order to attain the object, an image processing method of the present invention is an image processing method for scanning each pixel of an input image data in a raster order so as to quantize a multi-valued input pixel signal of said each pixel by using an error diffusion method, the image processing method including: the error adding step for calculating an additional value by adding an input pixel value of a quantization-target pixel to a diffusion error diffused from a quantized pixel; the quantizing step for calculating an output pixel value of the quantization-target pixel by quantizing the quantization-target pixel based on a result of comparison between the additional value and a threshold value; the error calculating step for calculating a quantization error based on the input pixel value, the additional value, and the output pixel value obtained by the quantization of the quantization-target pixel; the diffusion error calculating step for calculating a diffusion error to be diffused to a non-quantized pixel based on the quantization error and a positional relation between the quantization-target pixel and the non-quantized pixel; the adjustment standard value generating step for setting an adjustment standard value for every quantization-target pixel according to the output pixel value of the quantization-target pixel, the adjustment standard value providing a standard of correction of the additional value or the threshold value at a time of quantization of the non-quantized pixel; the adjustment value calculating step for calculating an adjustment value to be used in quantizing the quantization-target pixel, the adjustment value calculating section calculating the adjustment value by attenuating, according to a distance between the quantized pixel and the quantization-target pixel, the adjustment standard value set for the quantized pixel; and the threshold value correcting step for correcting, based on the adjustment value, the threshold value or the additional value used in quantizing the quantization-target pixel.

With the image processing apparatus and the image processing method, the adjustment standard value, which provides a standard of correction of the additional value or the threshold value at a time of quantization of the non-quantized pixel, is set for every quantization-target pixel according to the output pixel value of the quantization-target pixel. Then, the adjustment value to be used in quantizing the quantization-target pixel is calculated by attenuating, according to a distance between the quantized pixel and the quantization-target pixel, the adjustment standard value set for the quantized pixel. The threshold value or the additional value used in quantizing the quantization-target pixel is corrected based on the adjustment value thus calculated.

By this, a neighboring pixel of a pixel having a great output pixel value can be prevented, according to a distance between these pixels, from increasing in output pixel value. Therefore, it is possible to prevent a pattern unique to the error diffusion method from being formed in an output image by preventing output dots from being formed adjacent to each other. It is also possible to prevent decrease in image uniformity. Further, it is possible to reduce an amount of processing by significantly reducing the number of processing steps from the technique of Patent Literature 2, because the present invention only requires (i) calculating the adjustment standard value of a quantized pixel according to an output pixel value of the quantized pixel, (ii) calculating the adjustment value at a time of quantization of a non-quantized pixel according to the adjustment standard value of the quantized pixel and a distance between the quantized pixel and the non-quantized pixel, and (iii) correcting the threshold value or the additional value based on the adjustment value.

For a fuller understanding of the nature and advantages of the invention, reference should be made to the ensuing detailed description taken in conjunction with the accompanying drawings.

BRIEF DESCRIPTION OF DRAWINGS

FIG. 6 is a view illustrating transmission of a repulsive force in the image processing apparatus shown in FIG. 2.

DESCRIPTION OF EMBODIMENTS

Embodiment 1

One embodiment of the present invention is described below. Note that the present embodiment mainly describes an example of the present invention used in a digital copying machine.

(1-1. Entire Arrangement of Digital Copying Machine 1)

Figure 2:
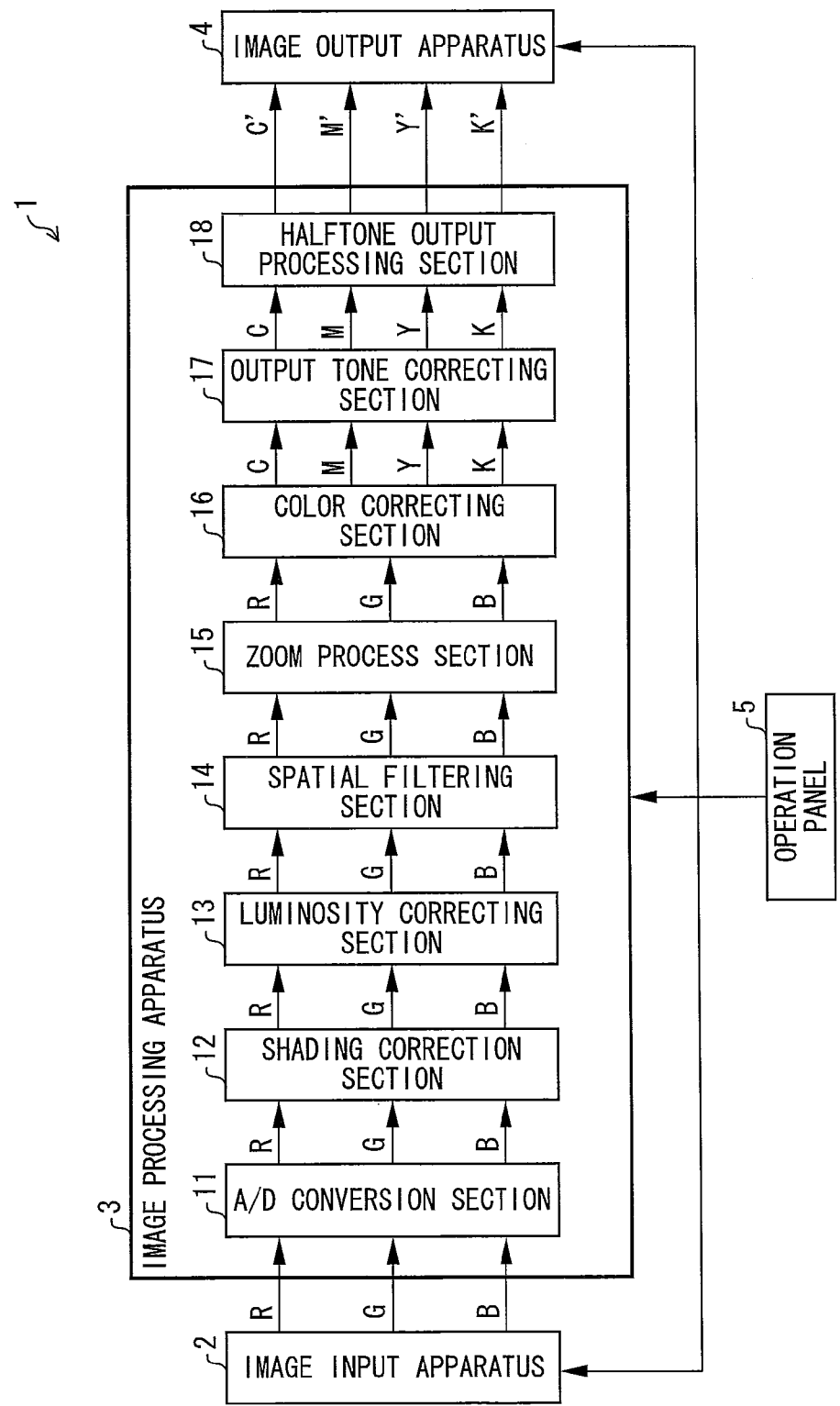
FIG. 2 is a block diagram schematically illustrating an arrangement of an image processing apparatus (image forming apparatus) in accordance with one embodiment of the present invention.

FIG. 2 is a block diagram schematically illustrating an arrangement of a digital copying machine (image forming apparatus) 1 in accordance with the present embodiment. As shown in FIG. 2, the digital copying machine 1 includes an image input apparatus 2, an image processing apparatus 3, an image output apparatus 4, and an operation panel 5.

The image input apparatus 2 produces image data by reading an original image, and includes, for example, a light source for irradiating the original image with reading light, and a scanner section (not shown) including a device such as a CCD (Charge Coupled Device) image sensor that converts optical information into an electric signal. The image input apparatus 2 produces a color image signal (RGB reflectance signal) by converting an image formed with reflected light of the original image into an electric signal (analog signal), i.e. RGB color separation signal (R: red, G: green, B: blue). Specifically, the image input apparatus 2 reads a two-dimensional image by moving the light source and the CCD image sensor in a longitudinal direction (main scanning direction) and vertical direction (sub-scanning direction) of the CCD image sensor, and then supplies the analog signal thus produced to the image processing apparatus 3. The analog signal may be converted into a digital signal by A/D (analog/digital) conversion before supplied to the image processing apparatus 3.

The image processing apparatus 3 applies various processings to the analog signal supplied from the image input apparatus 2, converts the analog signal so that the image output apparatus 4 can deal with the signal thus converted, and then supplies the converted signal to the image output apparatus 4.

As shown in FIG. 2, the image processing apparatus 3 includes an A/D conversion section 11, a shading correction section 12, a luminosity correcting section 13, a spatial filtering section 14, a zoom process section 15, a color correcting section 16, an output tone correcting section 17, and a halftone output processing section 18.

The A/D conversion section 11 converts the analog RGB signal supplied from the image input apparatus 2 into a digital RGB signal. The digital RGB signal converted from the analog RGB signal is then supplied to the shading correction section 12, the luminosity correcting section 13, the spatial filtering section 14, the zoom process section 15, the color correcting section 16, the output tone correcting section 17, and the halftone output processing section 18 in this order so as to become a digital CMYK signal. The digital CMYK signal supplied from the halftone output processing section 18 is temporarily stored in a memory (not shown) and then supplied to the image output apparatus 4. Note that the A/D conversion section 11 may be omitted in a case where the image input apparatus 2 includes an A/D conversion section so that the digital RGB signal is supplied to the image processing apparatus 3 from the image input apparatus 2.

From the digital RGB signal (reflectance signal), the shading correction section 12 removes various distortions caused by an illumination system, image focusing system, and image sensing system of the image input apparatus 2. Further, the shading correction section 12 adjusts a color balance and converts the digital RGB signal into a signal, such as a density (pixel value) signal, which an image processing system adapted to the image processing apparatus 3 can easily deal with. The RGB signal (RGB density (pixel value) signal), whose color balance is adjusted and distortions are removed by the shading correction section 12, is supplied to the luminosity correcting section 13.

Figure 3:
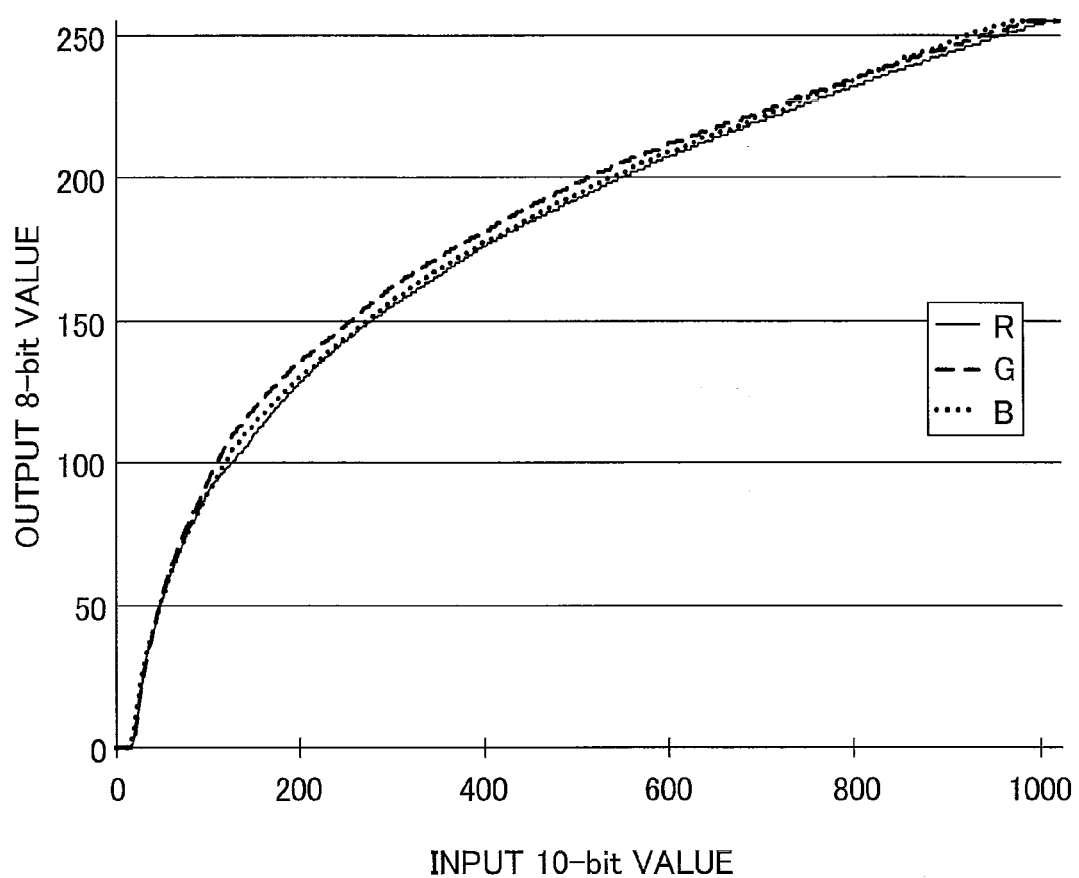
FIG. 3 is a graph showing a characteristic of data stored in a LUT memory provided in a luminosity correcting section of the image processing apparatus shown in FIG. 2.

The luminosity correcting section 13 corrects the RGB signal supplied form the shading correction section 12. The luminosity correcting section 13 performs the correction of the RGB signal according to a difference between a human luminosity characteristic and a sensitivity characteristic of the CCD image sensor serving as an image sensing element. Specifically, the luminosity correcting section 13 includes LUT (Look Up Table) memories with respect to each of R, G, and B signals. Each of the LUT memories shows a relation between an input value of the RGB signal and an output value of the RGB signal corrected as above. The luminosity correcting section 13 carries out the above-mentioned correction by reading out the output value from the LUT memories in response to the input value supplied from the shading correction section 12. The LUT memories store data that have a conversion characteristic shown in FIG. 3, for example.

The spatial filtering section 14 carries out a two-dimensional FIR (Finite Impulse Response) filtering so as to reduce deterioration of spatial frequency characteristic of a capture image attributed to an MTF (Modulation Transfer Function) characteristic of an optical lens used in an optical input apparatus of the image input apparatus 2.

The zoom process section 15 changes image data having a resolution and size adapted to the image input apparatus 2 into image data having a resolution and size adapted to the image output apparatus 4, so as to correct a difference in resolution between the image input apparatus 2 and the image output apparatus 4.

The color correcting section 16 converts the RGB signal into a CMYK (C: cyan, M: magenta, Y: yellow, K: black) density (pixel value) signal, and applies color correction to the CMYK density (pixel value) signal so that the image output apparatus 4 can achieve an accurate color reproduction. Specifically, the color correcting section 16 carries out the color correction so as to remove, from the CMYK density (pixel value) signal, color impurity attributed to a spectral characteristic of CMYK color materials including unnecessary absorption components.

The output tone correcting section 17 carries out a correction (tone correction) so that the CMYK density (pixel value) signal has a grey level in accordance with a characteristic of the image output apparatus 4.

The halftone output processing section 18 carries out halftone production (tone reproduction) so that tones will be finally reproduced by pixels that constitute an image. The halftone output processing section 18 is described in detail hereinafter.

The image data having been subjected to each of the processings above is temporarily stored in a memory (not shown) and then read out at a predetermined timing so as to be supplied to the image output apparatus 4.

The image output apparatus 4 outputs the image data, which is supplied from the image processing apparatus 3, to a recording material (such as a paper and an OHP film). The image output apparatus 4 is not limited in arrangement and may form an image as an electronic photograph or as an ink-jet printing.

The operation panel 5 includes, for example, a display section such as a liquid crystal display, a setup key and a numeric keypad for inputting various indications about an operation mode of the digital copying machine 1 and the like, and other components (none of them are shown). The operation panel 5 displays information on the display section in response to an instruction given from a main control section (not shown) of the digital copying machine 1, and transmits, to the main control section, information inputted by a user from the setup key and the numeric keypad. The user can use the operation panel 5 to input the number of copies, a request of processing to sections of the digital copying machine 1, and the like.

The main control section is constituted by a CPU (Central Processing Unit), for example, and controls operations of sections of the digital copying machine 1 based on a program and various data stored in a ROM or the like (not shown), or based on the information supplied from the operation panel 5, and the like.

Note that an image forming apparatus in accordance with the present embodiment is not limited to the arrangement above and may be a digital color multifunction device having a copy function, a printer function, a facsimile transmission function, a scan to e-mail function, and the like.

For example, the image forming apparatus in accordance with the present embodiment may be arranged so as to include, in addition to the digital copying machine 1, a communication apparatus (not shown) constituted by a modem and a network card. According to this arrangement, in a case of transmitting a facsimile, the modem (i) takes a procedure necessary for transmission to a transmission-counter part, so as to be allowed to perform the transmission thereto, (ii) reads out, from a memory, image data (image data read in by a scanner) compressed in a predetermined form, (iii) applies, to the image data, necessary processing such as a conversion of compression form, and (iv) transmits the image data to the destination via a communication line. In a case of receiving a facsimile, the modem receives transmitted image data while taking a procedure for communication, and then supplies the image data to the image processing apparatus 3. The image processing apparatus 3 applies, to the image data thus received, predetermined processings such as extension, rotation, resolution conversion, output tone correction, and tone reproduction. Then, the image processing apparatus 3 supplies the image data to the image output apparatus 4. The image output apparatus 4 outputs an image to a recording material based on the image data supplied from the image processing apparatus 3.

Further, the image processing apparatus in accordance with the present embodiment may be arranged so as to carry out a data communication with other digital multifunction device and a network-connected computer via a network card, a LAN cable, or the like. The present embodiment is not limited to a digital copying machine or a digital multifunction device for inputting/outputting a color image, and may be a monochrome copying machine or a monochrome multifunction device.

(1-2. Arrangement and Operation of Halftone Output Processing Section 18)

Figure 1:
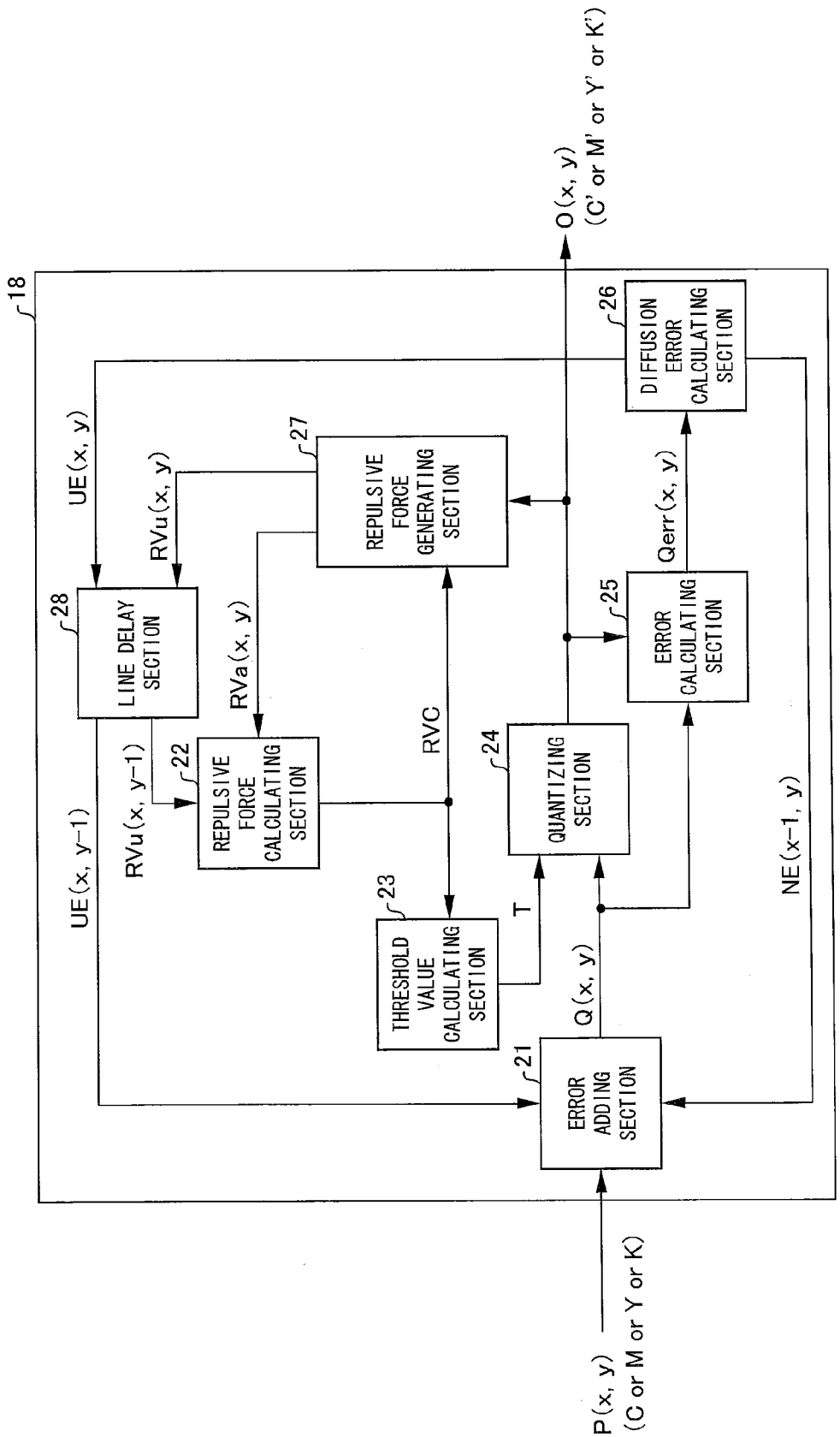
FIG. 1 is a block diagram illustrating an arrangement of a halftone output processing section provided in an image processing apparatus in accordance with one embodiment of the present invention.

An arrangement and operation of the halftone output processing section 18 are described below in detail. FIG. 1 is a block diagram illustrating an arrangement of the halftone output processing section 18.

The present embodiment describes a case where the halftone output processing section 18 is supplied with image data in which a pixel has each 8-bit data of C, M, Y, and K, and then binarizes the image data by predetermined processings described hereinafter so as to output image data in which the pixel has each 1-bit data of C', M', Y', and K'. In the 1-bit data, value 0 indicates not forming an output dot (not outputting), and value 1 indicates forming the output dot (outputting).

In the present embodiment, the halftone output processing section 18 operates with an idea of repulsive force. It should be noted that, in the present specification, the word "repulsive force (repulsive force value)" means a force for suppressing dot formation, and a threshold value of quatization (or pixel value of quantization) is changed in response to the repulsive force (repulsive force value) so that the output dot becomes difficult to be formed at the time of quantizaiton. The repulsive force (repulsive force value) is generated from a quantized pixel that forms an output dot, and is transmitted from the quantized pixel to neighboring pixels that have not been quantized so as to be attenuated according to a distance between the quantized pixel and each of the neighboring pixels. The repulsive force (repulsive force value) is attenuated so as to become 0 at a position that is sufficiently far from the quantized pixel that forms the output dot, so that dot formation at the position is not affected by the repulsive force. The repulsive force to be referred to when quantizing a quantization-target pixel is greater one of: (i) a repulsive force obtained by selecting from a plurality of repulsive forces that have been transmitted from the quantized pixel with attenuation (repulsive force obtained by integrating repulsive forces transmitted from pixels in a previous line of the quantization-target pixel), or (ii) a repulsive force transmitted from a pixel that is quantized immediately prior to the quantization-target pixel (from a pixel located horizontally adjacent to the quantization-target pixel).

Figure 4:
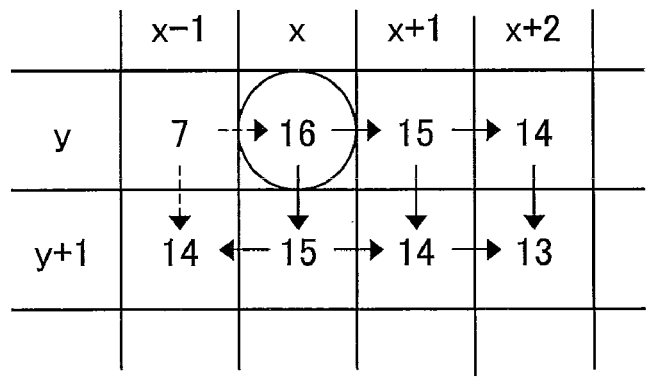
FIGS. 4(a) through 4(c) are views each illustrating how a repulsive force is attenuated while being transmitted in a halftone output processing section of the image processing apparatus shown in FIG. 2.
Figure 4:
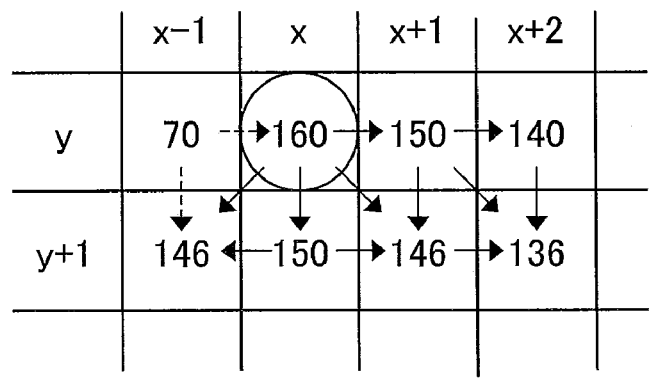
Figure 4:
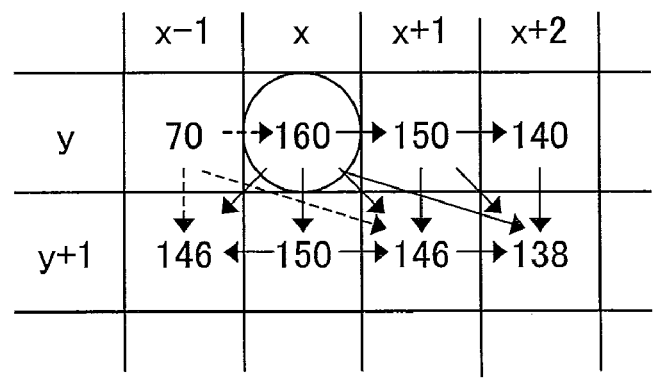

FIGS. 4(*a*) through 4(*c*) are views each illustrating how a repulsive force is attenuated while being transmitted. As shown in FIGS. 4(*a*) through 4(*c*), the repulsive force is generated when an output dot is formed in a quantization-target pixel (x, y). The quantization-target pixel (x, y) generates a repulsive force (adjustment standard value) of 16 and 160 in FIG. 4(*a*) and FIGS. 4(*b*) and 4(*c*), respectively. In these drawings, arrows indicate flows of the repulsive force transmitting from a quantized pixel and being used as a reference of calculation of a repulsive force (adjustment value) used in quantizing a not-yet-quantized pixel.

In FIG. 4(*a*), the repulsive force generated in the quantization-target pixel is attenuated according to a Manhattan distance (in which a distance between pixels located obliquely adjacent to each other is regarded as twice longer than a distance between pixels located horizontally or vertically adjacent to each other) when being transmitted down, right, and left to pixels to be quantized after the quantization-target pixel. Note that, in FIG. 4(*a*), a distance between pixels located horizontally adjacent to each other is set to 1. In FIG. 4(*a*), when calculating a repulsive force to be applied to a pixel, repulsive forces transmitted from pixels located adjacent to the pixel in an upper direction and horizontal direction are used as a reference of that calculation.

In FIG. 4(*b*), the repulsive force generated in the quantization-target pixel is attenuated, while being transmitted down, right, left, and obliquely down to pixels to be quantized after the quantization-target pixel, according to a distance between the quantization-target pixel and each of the pixels. Note that, in FIG. 4(*b*), a distance between pixels located obliquely adjacent to each other is regarded as √2 times longer than a distance between pixels located horizontally or vertically adjacent to each other. In FIG. 4(*b*), the distance between pixels located horizontally adjacent to each other is set to 10. In FIG. 4(*b*), when calculating a repulsive force to be applied to a pixel, repulsive forces transmitted from respective pixels located adjacent to the pixel in an upper direction, a horizontal direction, and a right upper and left upper direction are used as a reference of that calculation.

In FIG. 4(*c*), the repulsive force generated in the quantization-target pixel is transmitted to pixels to be quantized after the quantization-target pixel, which pixels are located farther from the quantization-target pixel than a case of FIG. 4(*b*). In FIG. 4(*c*), the repulsive force generated in the quantization-target pixel is transmitted to respective pixels located adjacent to the quantization-target pixel in a lower direction, a horizontal direction, and an oblique direction, and to pixels located adjacent in a horizontal direction to the pixels located adjacent to the quantization-target pixel in the oblique direction. This makes it possible to more accurately calculate an attenuation of the repulsive force than cases of FIGS. 4(*a*) and 4(*b*). Note that, in FIG. 4(*c*), the distance between pixels located horizontally adjacent to each other is set to 10.

When estimating the attenuation of the repulsive force, it is possible to more accurately calculate the attenuation by using, as a reference, repulsive forces transmitted from a larger number of neighboring pixels, as shown in FIGS. 4(*c*) and 4(*b*). However, use of the repulsive forces transmitted from a larger number of the neighboring pixels causes an increase in decomposition of repulsive force values and in amount of calculation of the repulsive forces transmitted from the neighboring pixels. Using the Manhattan distance as in FIG. 4(*a*) requires a smaller amount of calculation than the cases of FIGS. 4(*b*) and 4(*c*), although an accuracy of the calculation of repulsive force is lowered. Therefore, the attenuation of repulsive force during transmission can be estimated by an appropriate method according to a required degree of ability in decomposition of the repulsive force values, processing ability (processing speed) of calculating means, and the like. With any cases of FIGS. 4(*a*) through 4(*c*), it is possible to improve the problem that a pattern (texture) unique to the error diffusion becomes easy to see and the problem of low image uniformity. Further, it is possible to reduce the number of processing steps and an amount of processing from the technique of Patent Literature 2.

The present embodiment describes a case where the halftone output processing section 18 separately carries out each calculation with respect to C, M, Y, and K without taking into account data of other colors. Further, it is presumed that each processing with respect to C, M, Y, and K is applied to image data in the same way. In view of this, FIG. 1 illustrates only a part of the halftone output processing section 18 dealing with a single plane color (either C, M, Y, or K), and explains only a processing with respect to the single plane color. It should be noted that, in a case of using the present invention in a monochrome multifunction device, image data with respect to K, in which a pixel has 8-bit data, is inputted so as to be binarized by predetermined processings described hereinafter so that image data in which the pixel has 1-bit data of K' is outputted.

As shown in FIG. 1, the halftone output processing section 18 includes an error adding section 21, a repulsive force calculating section (adjustment value calculating section) 22, a threshold value calculating section 23, a quantizing section 24, an error calculating section 25, a diffusion error calculating section 26, a repulsive force generating section (adjustment standard value generating section) 27, and a line delay section 28. It is arranged so that a maximum and minimum repulsive force values are 16 and 0, respectively, and the repulsive force is attenuated by 1 according to a Manhattan distance as described above with reference to FIG. 4(a).

Figure 5:
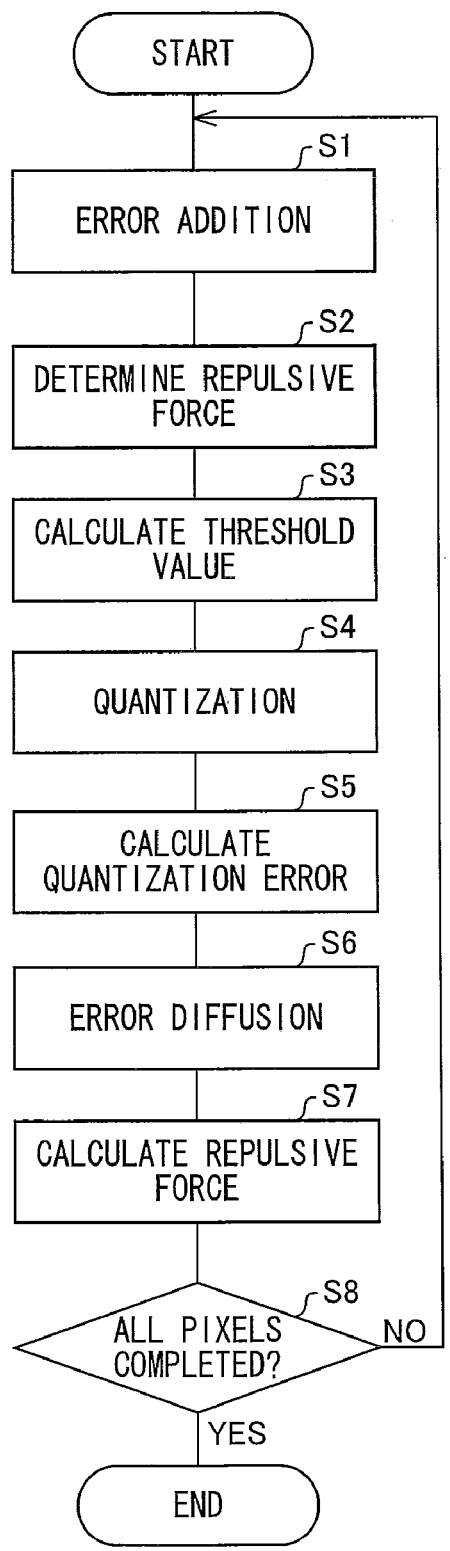
FIG. 5 is a flow chart illustrating processes in a halftone output processing section of the image processing apparatus shown in FIG. 2.

FIG. 5 is a flow chart illustrating processes in the halftone output processing section 18. A process flow in the halftone output processing section 18 and operations of each section of the halftone output processing section 18 are described below with reference to FIGS. 1 and 5.

As shown in FIG. 5, once image data (input pixel value P(x, y) of either C, M, Y, or K) of a quantization-target pixel (x, y) is supplied from an output tone correcting section 17 to the halftone output processing section 18, the error adding section 21 carries out error addition to the input pixel value P(x, y) (S1).

Specifically, the error adding section 21 calculates a quantization object value Q(x, y) by adding sum UE(x, y−1) of diffusion errors and a diffusion error NE(x−1, y) to the input pixel value P(x, y) of the quantization-target pixel (x, y) supplied from the output tone correcting section 17. The sum UE(x, y−1) of diffusion errors is a sum of diffusion errors generated in neighboring pixels (x−1, y−1), (x, y−1), and (x+1, y−1) which are located in a previous main scanning line of the quantization-target pixel. The sum UE of diffusion errors is supplied from the line delay section 28. The diffusion error NE(x−1, y) is generated in a neighboring pixel (x−1, y) which is quantized immediately prior to the quantization-target pixel. Then, the error adding section 21 supplies the quantization object value Q(x, y) to the quantizing section 24 and the error calculating section 25.

That is, the error adding section 21 calculates the quantization object value Q(x, y) of the quantization-target pixel by using Equation (10):

$$Q(x,y)=P(x,y)+UE(x,y-1)+NE(x-1,y) \qquad \text{Equation (10)}.$$

UE(x, y−1) and NE(x−1, y) are supplied to the error adding section 21 from the line delay section 28 and the diffusion error calculating section 26, respectively. How UE(x, y−1) and NE(x−1, y) are calculated is described hereinafter.

Next, the repulsive force calculating section (adjustment value calculating section) 22 calculates a repulsive force value (adjustment value) RVC to be applied to the quantization-target pixel (x, y) at the time of quantization. Then, the repulsive force calculating section 22 supplies a calculation result of the repulsive force value RVC to the threshold value calculating section 23 and the repulsive force generating section 27 (S2).

Specifically, the repulsive force calculating section 22 receives (i) a repulsive force value RVa(x−1, y) and a repulsive force value RVu(x, y−1). The repulsive force value RVa(x−1, y) is transmitted thereto, via the repulsive force generating section 27, from the neighboring pixel (x−1, y) that is quantized immediately prior to the quantization-target pixel. The repulsive force value RVu(x, y−1) is transmitted thereto, via the line delay section 28, from a pixel (x, y−1) located adjacent to the quantization-target pixel (x, y) in an upper direction. Then, the repulsive force calculating section 22 supplies the threshold value calculating section 23 and the repulsive force generating section 27 with greater one of the repulsive force values RVa(x−1, y) and RVu(x, y−1) as the repulsive force value RVC. The line delay section 28 stores the repulsive force value, which is calculated in the repulsive force generating section 27, of a pixel until quantization of other pixel located adjacent to the pixel in a right lower direction is completed. How the repulsive force value (adjustment standard value) is calculated in the repulsive force generating section 27 is described hereinafter.

Next, the threshold value calculating section 23 calculates a threshold value T used in quantizing the quantization-target pixel (x, y) (S3).

Specifically, the threshold calculating section 23 calculates the threshold value T by using Equation (11) with the repulsive force value RVC supplied from the repulsive force calculating section 22. Then, the threshold calculating section 23 supplies the threshold value T thus calculated to the quantizing section 24:

$$T=128+\alpha \times RVC \qquad \text{Equation (11)}.$$

In Equation (11), α is a parameter coefficient; and the greater α is, the more difficult an output dot becomes to be formed in a region adjacent to an output dot having been formed. The present embodiment is arranged so that α is 4.0. However, the present invention is not limited to this.

Next, the quantizing section 24 calculates a quantization value O(x, y) (carries out a quantization) by threshold processing with the use of the quantization object value Q(x, y) supplied from the error adding section 21 and the threshold value T supplied from the threshold value calculating section 23. Then, the quantizing section 24 supplies the quantization value O(x, y) to the error calculating section 25, the repulsive force generating section 27, and the image output apparatus 4 (S4).

Specifically, the quantizing section 24 determines the quantization value O so that O(x, y)=0 when Q(x, y)<T; and O(x, y)=1 when Q(x, y)≧T. The output dot is not formed when O(x, y)=0, but is formed when O(x, y)=1. In the present embodiment, the repulsive force is reflected in the quantization in such a way that the threshold value used in the quantization is increased according to the repulsive force value RVC. However, the present invention is not limited to this, and may be such that the quantization object value Q(x, y) is decreased according to the repulsive force value RVC whereas the threshold value T is kept constant, for example.

Next, the error calculating section 25 calculates a quantization error Qerr(x, y) by using the quantization object value Q(x, y) and the quantization value O(x, y) that are supplied from the error adding section 21 and the quantizing section 24, respectively. Then, the error calculating section 25 supplies the quantization error Qerr (x, y) to the diffusion error calculating section 26 (S5).

Specifically, the error calculating section 25 calculates the quantization error Qerr(x, y) by using Equation (12) or Equation (13) as follows:

$$Qerr=Q(x,y)-255 \qquad \text{Equation (12)}$$

when $O(x, y)=1$; and $$Q\text{err}=Q(x,y) \quad \text{Equation (13)}$$

when $O(x, y)=0$.

Figure 12:
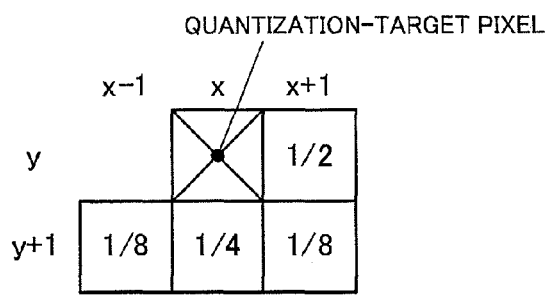
FIG. 12 is a view illustrating how an error diffusion method is carried out in a conventional image processing apparatus.
Figure 13:
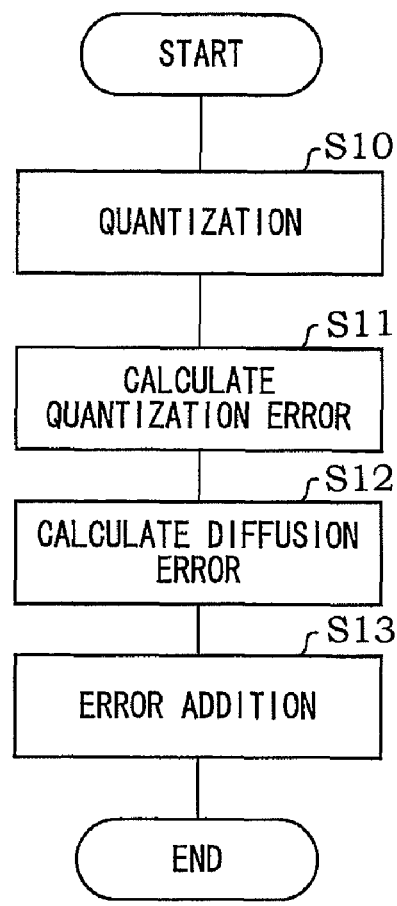
FIG. 13 is a flow chart illustrating processes for carrying out an error diffusion method in a conventional image processing apparatus.

Next, in the same way as in FIG. 12, the diffusion error calculating section 26 carries out a diffusion of the quantization error (calculation of diffusion error) with regard to neighboring pixels of the quantization-target pixel, i.e., $(x+1, y)$, $(x-1, y+1)$, $(x, y+1)$, and $(x+1, y+1)$. Then, the diffusion error calculating section 26 calculates $UE(x, y)$ that affects the pixel $(x, y+1)$ and $NE(x, y)$ that affects the pixel $(x+1, y)$ (S6).

Specifically, the diffusion error calculating section 26 calculates $UE(x, y)$ and $NE(x, y)$ by using Equation (14) and Equation (15), respectively:

$$UE(x,y)=DEd(x-1,y)+DEc(x,y)+DEb(x+1,y) \quad \text{Equation (14)},$$

and $$NE(x,y)=DEa(x,y) \quad \text{Equation (15)}.$$

$DEa(x, y)$, $DEb(x, y)$, $DEc(x, y)$, and $DEd(x, y)$ are calculated with the following equations by using predetermined diffusion coefficients based on an idea substantially same as in FIG. 12:

$$DEa(x,y)=Q\text{err}(x,y)\times\tfrac{1}{2} \quad \text{Equation (16)}$$

$$DEb(x,y)=Q\text{err}(x,y)\times\tfrac{1}{8} \quad \text{Equation (17)},$$

$$DEc(x,y)=Q\text{err}(x,y)\times\tfrac{1}{4} \quad \text{Equation (18), and}$$

$$DEd(x,y)=Q\text{err}(x,y)\times\tfrac{1}{8} \quad \text{Equation (19)},$$

where $Q\text{err}(x, y)$ can be calculated in the error calculating section 25 by using Equation (12) or (13).

The diffusion error calculating section 26 supplies $UE(x, y)$ and $NE(x, y)$ calculated as above to the line delay section 28 and the error adding section 21, respectively.

Then, the repulsive force generating section (adjustment standard value generating section) 27 calculates a repulsive force value (adjustment standard value) $RVa(x, y)$ to be transmitted to a pixel $(x+1, y)$, which is adjacently located on the right of the quantization-target pixel $(x, y)$. The repulsive force generating section 27 also calculates a repulsive force value (adjustment standard value) $RVc(x, y)$ to be transmitted to a pixel $(x, y+1)$, which is located adjacent to the quantization-target pixel $(x, y)$ in a lower direction (S7).

Specifically, the repulsive force generating section 27 determines $RVa(x, y)$ and $RVc(x, y)$ as follows:

$$RVa(x,y)=RVc(x,y)=15 \quad \text{Equation (20)}$$

when $O(x, y)=1$;

$$RVa(x,y)=RVc(x,y)=RVC-s \quad \text{Equation (21)}$$

when $O(x, y)=0$ and $RVC \geq s$; and $$RVa(x,y)=RVc(x,y)=0 \quad \text{Equation (22)}$$

when $O(x, y)=0$ and $RVC(x, y)<s$,
where s is an amount of attenuation (attenuation value) of repulsive force being transmitted to pixels located vertically and horizontally adjacent to the quantization-target pixel. The present embodiment is arranged so that $s=1$.

When the quantization-target pixel $(x, y)$ forms an output dot, each of the repulsive forces $RVa(x, y)$ and $RVc(x, y)$ to be transmitted to respective pixels that are located adjacent to the quantization-target pixel in the right and lower direction becomes 15 as a result of a subtraction in which a distance of 1 is subtracted from a maximum repulsive force value 16 according to Equation (20). When the quantization-target pixel forms the output dot and the repulsive force RVC is equal to or more than s, the repulsive forces $RVa(x, y)$ and $RVc(x, y)$ are determined by subtracting a distance s $(=1)$ from the repulsive force RVC (the minimum value of RVa and RVc is 0). When the quantization-target pixel does not form the output dot and the repulsive force RVC is less than s, the repulsive forces $RVa(x, y)$ and $RVc(x, y)$ are 0.

Figure 6:
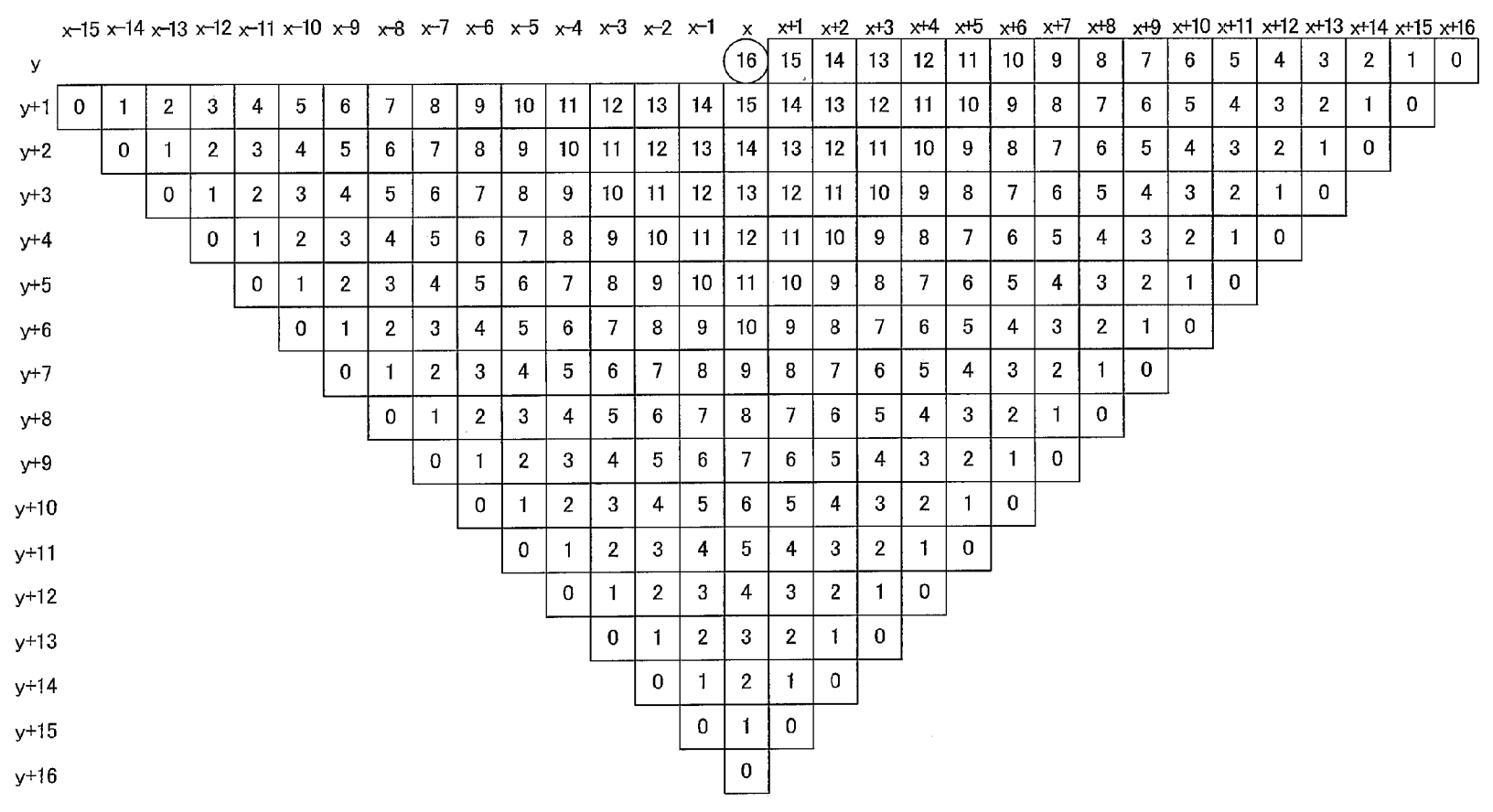

As shown in FIG. 6, the repulsive force generated in the quantization-target pixel $(x, y)$ is transmitted to non-quantized pixels. This transmission of the repulsive force generated in the quantization-target pixel $(x, y)$ can be reflected, by RVc calculated as above, in the non-quantized pixels that are located in such a direction that values of both x and y increase. However, the transmission cannot be appropriately reflected, by RVc calculated as above, in the non-quantized pixels that are located in such a direction that the value of x decreases. For example, a transmission of repulsive force from a pixel $(x, y)$ to a pixel $(x-14, y+1)$ shown in FIG. 6 cannot be appropriately reflected in the pixel $(x-14, y+1)$ only by calculating a repulsive force to be applied to the pixel $(x-14, y+1)$ in a raster order with reference to repulsive forces of neighboring pixels.

In view of this, the repulsive force generating section 27 calculates, by using Equation (23), a repulsive force RVu to be transmitted to a pixel that is located in such a direction of the quantization-target pixel $(x, y)$ that the value of x decreases:

$$RVu(x,y)=\max(RVc(x+n,y)-n\times s) \quad \text{Equation (23)},$$

where n is an integer not less than 0 and not more than $14/s$, and max is a maximum value.

Then, the repulsive force generating section 27 supplies the repulsive force $RVa(x, y)$ calculated as above to the repulsive force calculating section 22, and supplies the repulsive force $RVu(x, y)$ calculated as above to the line delay section 28.

The line delay section 28 temporarily stores $UE(x, y)$ supplied from the diffusion error calculating section 26 and $RVu(x, y)$ supplied from the repulsive force generating section 27. Then, the line delay section 28 supplies $UE(x, y)$ and $RVu(x, y)$ to the error adding section 21 and the repulsive force calculating section 22, respectively, at a timing of quantization of pixels located in a following line $(y+1)$.

Then, the main control section of the digital copying machine 1 determines whether the processes S1 through S7 have been applied to all pixels (S8). When an unprocessed pixel is remained, a next quantization-target pixel is selected in a raster order so as to be subjected to the processes S1 through S7. When it is determined that all of the pixels are processed, the main control section stops operating.

In the present embodiment, which uses an idea of repulsive force that is attenuated according to a distance from a pixel that forms an output dot, quantization values of each pixel are calculated so that a pixel closer to the pixel that forms the output dot becomes less likely to form an output dot.

Figure 7:
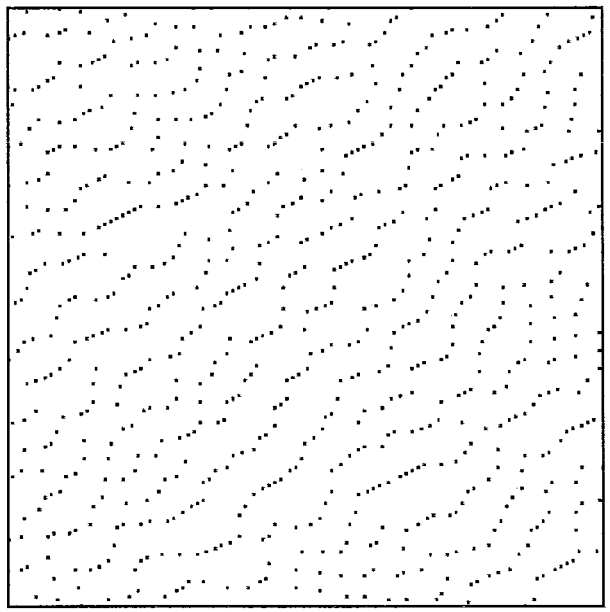
FIG. 7(a) is a view illustrating output dots formed when a halftone output processing is carried out by a conventional error diffusion method.
FIG. 7(b) is a view illustrating output dots formed when a halftone output processing is carried out by using the image processing apparatus shown in FIG. 2.
Figure 7:
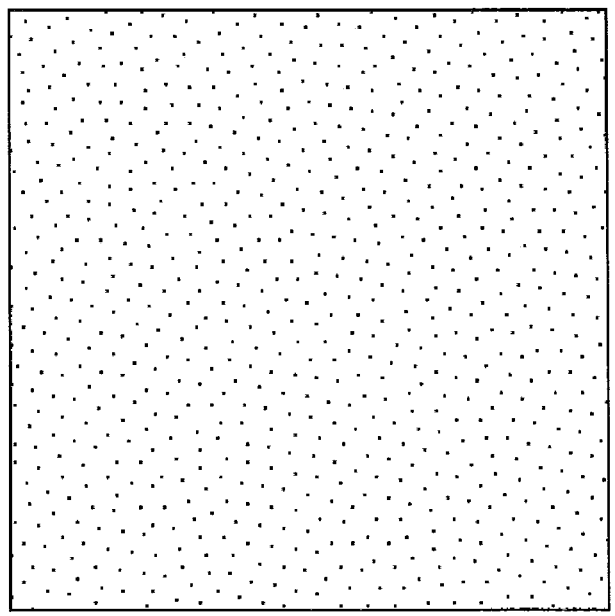

This makes it possible, as illustrated in FIGS. 7(*a*) and 7(*b*), to prevent the output dots from being formed in the vicinity of each other. This allows improving the problems of a conventional error diffusion method in that a pattern unique to the error diffusion is formed and that image uniformity is lowered. FIG. 7(*a*) is a view illustrating output dots formed when an input value of 5 is continuously supplied to a processing section that carries out a conventional halftone output processing. FIG. 7(*b*) is a view illustrating output dots formed when the same input value as in FIG. 7(*a*) is supplied to the halftone output processing section 18 of the digital copying machine 1 in accordance with the present embodiment.

The present embodiment describes a case of binary error diffusion processing. However, the present invention is not limited to this, and may be applied to a multi-valued error diffusion processing such as four-valued (tetranary) error diffusion. When applying the present invention to the multi-valued error diffusion processing, RVa(x, y) and RVc(x, y) do not have a uniform value of 15 unlike a case using Equation (20), but are determined in response to O(x, y) after four-valued (tetranary) quantization. For example, instead of Equation (20), the following equations (20-1) through (20-5) can be used in determining RVa(x, y) and RVc(x, y) depending on situations.

$$RVa(x,y)=RVc(x,y)=RVC-s \qquad \text{Equation (20-1)}$$

when (x, y)=1 and RVC>5+s;

$$RVa(x,y)=RVc(x,y)=5 \qquad \text{Equation (20-2)}$$

when (x, y)=1 and RVC≦5+s;

$$RVa(x,y)=RVc(x,y)=RVC-s \qquad \text{Equation (20-3)}$$

when (x, y)=2 and RVC>10+s;

$$RVa(x,y)=RVc(x,y)=10 \qquad \text{Equation (20-4)}$$

when (x, y)=2 and RVC≦10+s;

$$RVa(x,y)=RVc(x,y)=15 \qquad \text{Equation (20-5)}$$

when (x, y)=3
This makes it possible to change the repulsive force value in response to the quantization value.

Embodiment 2

Another embodiment of the present invention is described below. For convenience, components having the same function as in Embodiment 1 are indicated with the same reference numerals and explanations of the components are omitted.

Figure 8:
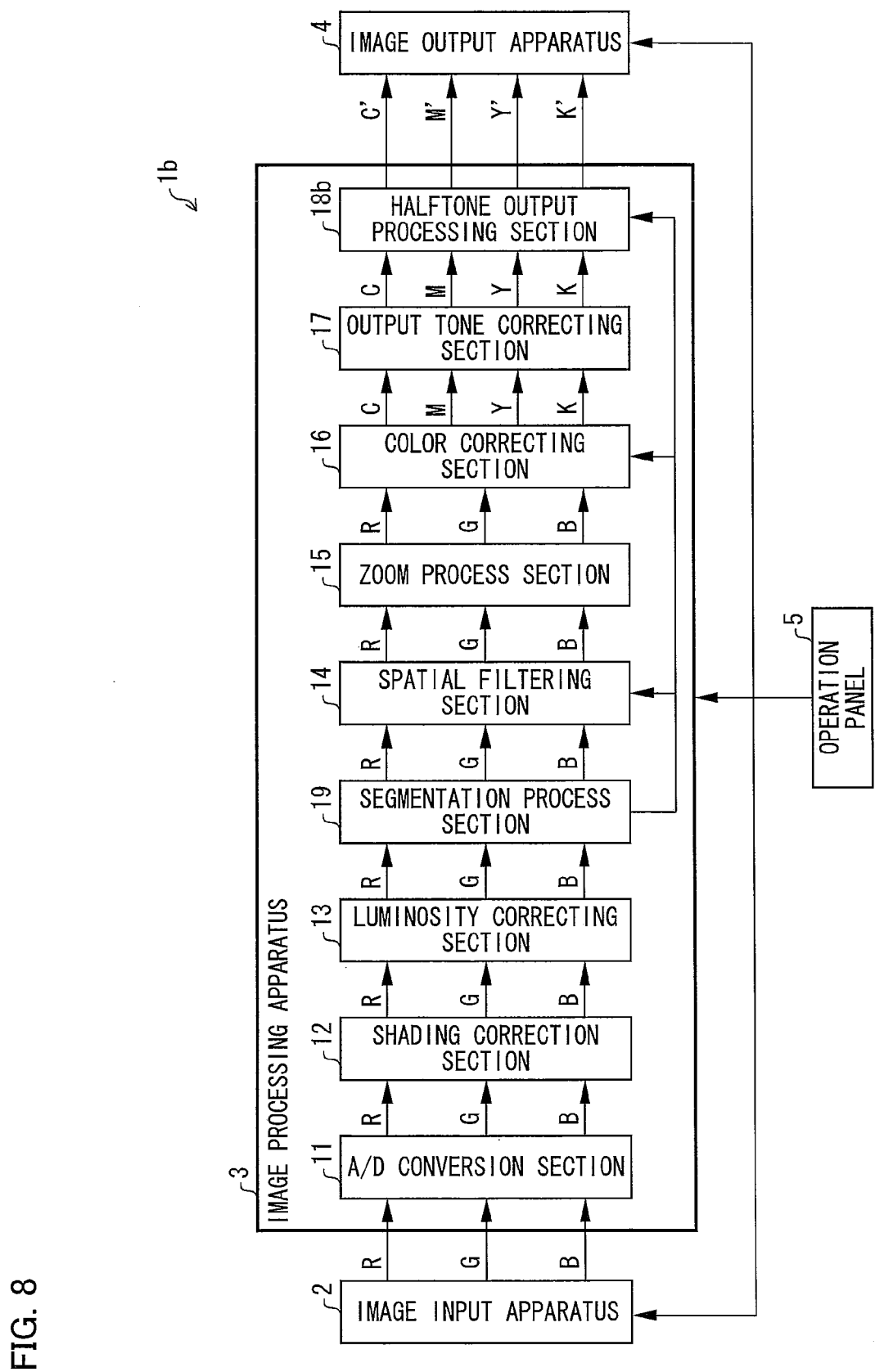
FIG. 8 is a block diagram schematically illustrating an arrangement of an image processing apparatus (image forming apparatus) in accordance with another embodiment of the present invention.

FIG. 8 is a block diagram schematically illustrating an arrangement of a digital copying machine (image processing apparatus, image forming apparatus) 1b in accordance with the present embodiment. The digital copying machine 1b is arranged in the substantially same way as the digital copying machine 1 shown in FIG. 2, except that a segmentation process section 19 is provided between a luminosity correcting section 13 and a spatial filtering section 14 and that a halftone output processing section 18b is provided instead of the halftone output processing section 18.

Based on a RGB signal supplied from the luminosity correcting section 13, the segmentation process section 19 judges to which region each pixel of input image data belongs among a text edge region, a halftone dot region, and other region, for example. Further, the segmentation process section 19 supplies a region separation signal to the spatial filtering section 14, a color correcting section 16, and the halftone output processing section 18b, the region separation signal indicating to which region the pixel belongs. The segmentation process section 19 also supplies, to the subsequent spatial filtering section 14, the RGB signal supplied from the luminosity correcting section 13 without changing the signal.

The pixel judged by the segmentation process section 19 as belonging to the text region is subjected to a sharpening enhancement in the spatial filtering section 14, and then subjected to a processing in the color correcting section 16 so that an amount of black generation in a black text increases. The pixel judged by the segmentation process section 19 as belonging to the halftone dot region is subjected to a smoothing process in the spatial filtering section 14 using a filter having a smoothing characteristic.

The segmentation process section 19 is not particularly limited as to how the region separation is carried out, and can adopt various known methods such as a method disclosed in Patent Literature 3 (Japanese Patent Application Publication, Tokukai, No. 2002-232708, publication date: Aug. 16, 2002), for example.

The region separation method disclosed in Patent Literature 3 is briefly described below. In this method, (i) a maximum density difference which is a difference between a minimum density and a maximum density, and (ii) a busyness which is a summation of absolute values of respective differences in density between adjacent pixels are calculated for a m×n block (15×15 pixels, for example) including a quantization-target pixel. Then, the method compares the maximum density difference with a predetermined threshold value of maximum density difference, and compares the busyness with a threshold value of busyness. According to results of these comparisons, the quantization-target pixel is classified as belonging to a text edge region, a halftone dot region, or other region (background/photographic picture region).

The background region generally exhibits such a density distribution that the maximum density difference and the busyness are extremely small due to a small change in density. The photographic picture region ("photographic picture" herein means a continuous-tone region like a silver-halide photograph, for example) exhibits such a density distribution that the maximum density difference and the busyness are small but slightly larger than those in the background region due to a smooth change in density. That is, the maximum density difference and the busyness are small in the background region and the photographic picture region (other region).

In view of this, when the maximum density difference is smaller than the threshold value of maximum density difference and the busyness is smaller than the threshold value of busyness, the quantization-target pixel is judged as belonging to said other region (background/photographic picture region). Otherwise, the quantization-target pixel is judged as belonging to the text/halftone dot region.

When the quantization-target pixel is judged as belonging to the text/halftone dot region, the busyness is compared to a result of multiplication of the maximum density difference and a text/halftone dot judgment threshold value. Based on a result of this comparison, the quantization-target pixel is classified as belonging to either the text edge region or the halftone dot region.

In the halftone dot region, the maximum density difference varies according to halftone dot, whereas the busyness is large because a density change occurs to the number of the halftone dots. That is to say, the halftone dot region has such a density distribution that a ratio of the busyness to the maximum density difference is high. In the text edge region, the maximum density difference is large, and accordingly, the busyness becomes large. However, the text edge region exhibits a smaller change in density than the halftone dot region. Therefore, the text edge region has a smaller busyness than the halftone dot region.

In view of this, when the busyness is greater than the multiplication of the maximum density difference and the text/halftone dot judgment threshold value, the quantization-target pixel is judged as belonging to the halftone dot region. When the busyness is smaller than the multiplication, the quantization-target pixel is judged as belonging to the text edge region.

Figure 9:
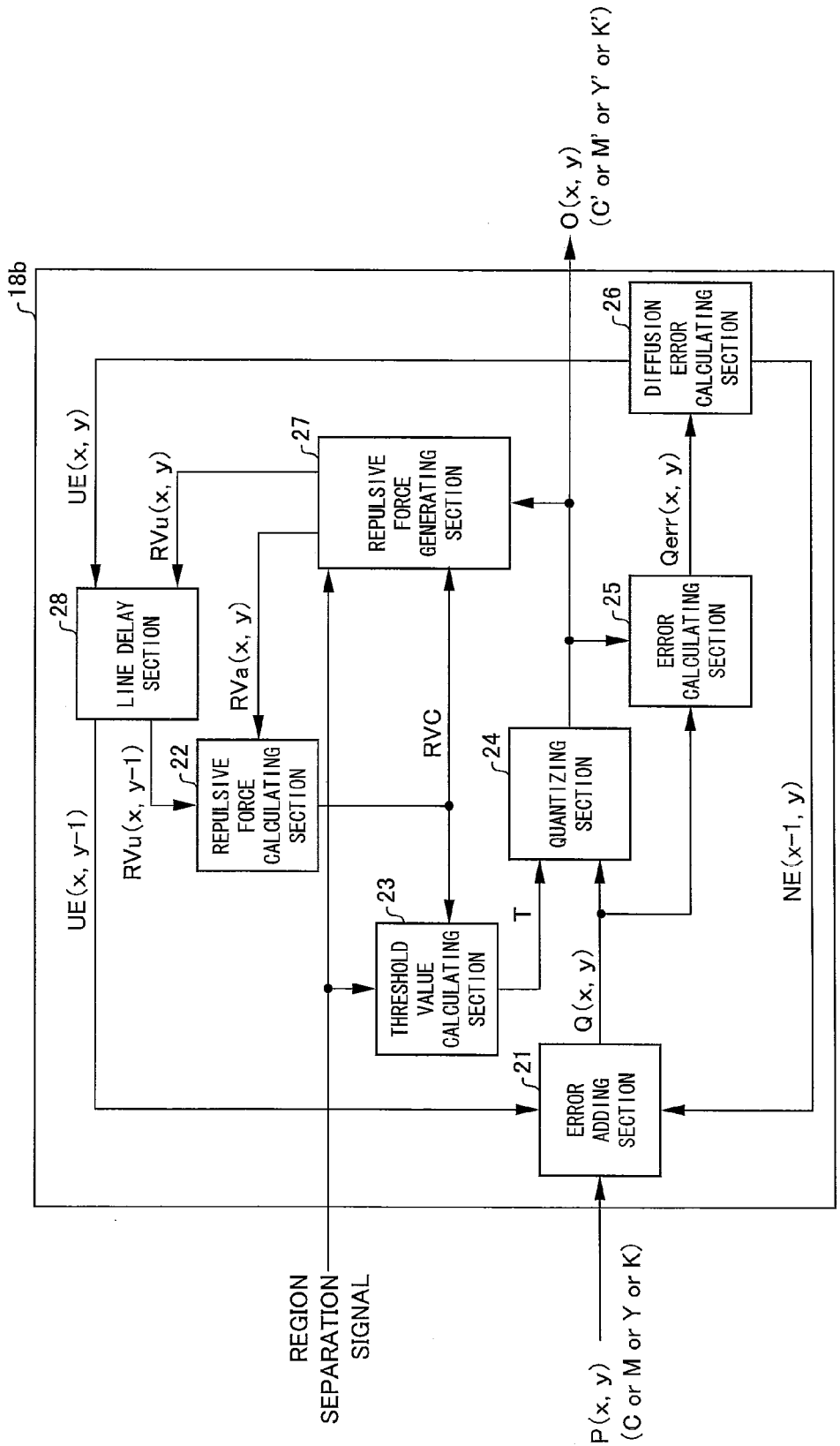
FIG. 9 is a block diagram illustrating an arrangement of a halftone output processing section provided in the image processing apparatus shown in FIG. 9.

FIG. 9 is a block diagram illustrating an arrangement of the halftone output processing section 18b. As shown in FIG. 9, the halftone output processing section 18b is arranged in the same way as the halftone output processing section 18 in accordance with Embodiment 1, except that a region separation signal is supplied from the segmentation process section 19 to a threshold value calculating section 23 and a repulsive force generating section 27.

The threshold value calculating section 23 calculates a threshold value T by using Equation (11) and then supplies the threshold value T thus calculated to a quantizing section 24, as in Embodiment 1. In this regard, however, the threshold value calculating section 23 changes a parameter coefficient α of Equation (11) in response to the region separation signal so that α=4.0 when a quantization-target pixel is judged as belonging to a region other than the text edge region; and α=0.0 when the quantization-target pixel is judged as belonging to the text edge region.

The repulsive force generating section 27 calculates a repulsive force RVa(x, y) and a repulsive force RVu(x, y), and then supplies RVa(x, y) and RVu(x, y) to a repulsive force calculating section 22 and a line delay section 28, respectively.

The repulsive force generating section 27 uses Equation (20b) instead of Equation (20) when O(x, y)=1:

$$RVa(x,y)=RVc(x,y)=15\times\beta \qquad \text{Equation (20b)},$$

where β is set to 0.0 when the quantization-target pixel belongs to the text edge region, meanwhile β is set to 1.0 when the quantization-target pixel belongs to the region other than the text edge region.

By this, it is possible to prevent the repulsive force from being applied to neighboring pixels when the quantization-target pixel belongs to the text edge region. It is also possible to arrange so that pixels in the text edge region are not affected by the repulsive force at the time of quantization. This prevents a dispersion of output dots in the vicinity of the text edge region and in the text edge region. As a result, it becomes possible to prevent (i) a blurring of text outline caused by the dispersion of output dots on a border between the text edge region and its background region (halftone dot region or other region) and (ii) a standing out of a text from its surrounding image due to a separation between the text and dots surrounding the text.

In the present embodiment, the repulsive force is arranged so as not to affect the pixels in the text edge region. However, values of α and β may be changed according to which region the quantization-target pixel belongs, in a case where the segmentation process section 19 further classifies the text edge region into a plurality of regions such as (i) a low-density text edge region (for example, a region where an average pixel value of text edge pixels is not less than 128 within a block of 5×5 pixels), (ii) a high-density text edge region (for example, a region where the average pixel value of text edge pixels is less than 128 within a block of 5×5 pixels), and (iii) a text edge neighboring region. This makes it possible to more accurately control the dispersion of output dots by using Equation (20b). For example, it can be arranged so that (i) α=0.0 and β=1.0 in a case of the low-density text edge region; (ii) α=0.0 and β=0.0 in a case of the high-density text edge region; (iii) α=2.0 and β=0.5 in a case of the text edge neighboring region; and (iv) α=4.0 and β=1.0 in a case of other region. With this arrangement, it is possible to suppress a standing out of edge caused by a separation of output dots between the high-density text edge region and a low-density background. Further, it is possible to prevent an occurrence of thinned edge caused by the dispersion of output dots in the low-density text edge region, which belongs to a low-density region, and at the same time, it is possible to cause dot dispersion in a background surrounding the edge. The text edge neighboring region can be processed as an intermediate between the background and the text edge. This makes it possible to reduce a large difference in quantization result between the regions, which difference is attributed to a difference in processing and a reduction of region separation error.

In the present embodiment, RVa and RVc are adjusted according to an image type that the quantization-target pixel shows (result of region separation) by adjusting (correcting) α and β according to the image type, wherein a value of s is kept constant. However, the present invention is not limited to this. For example, it can be arranged so that the value of s is adjusted (corrected) according to the image type that the quantization-target pixel shows (result of region separation).

Figure 14:
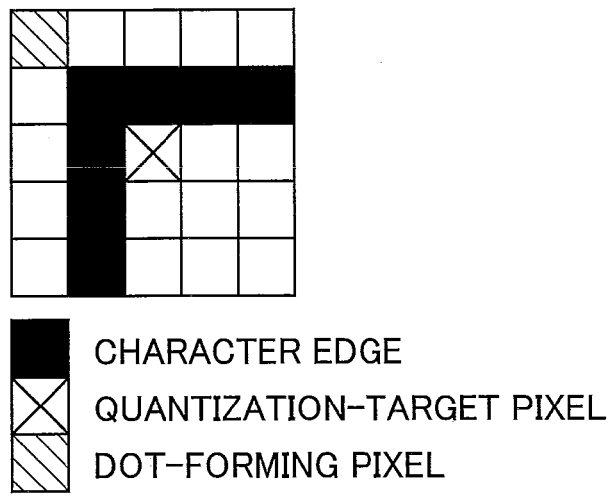
FIG. 14(a) is a view illustrating an example of image data, in which (i) a quantization-target pixel is surrounded by text edge pixels and (ii) each of the text edge pixels is located between the quantization-target pixel and a pixel on which a dot is formed.
FIG. 14(b) is a view illustrating a result of a processing applied to the image data shown in FIG. 14(a) with a constant attenuation value.
FIG. 14(c) is a view illustrating a result of a processing applied to the image data shown in FIG. 14(a) with an attenuation value that is changed depending on a type of region to which the quantization-target pixel belongs.

For example, when the quantization-target pixel is out of the text edge region and neighboring pixels of the quantization-target pixel are surrounded by the text edge region as shown in FIG. 14(a), a repulsive force is transmitted to the quantization-target pixel so that a repulsive force value RVu increases as shown in FIG. 14(b), although the text edge region exists between the quantization-target pixel and a pixel forming a dot.

In regard to this, for example, by arranging so that s=15 in the text edge region; and s=1 in the regions other than the text edge region, it is possible to prevent the repulsive force value RVu from increasing due to an unnecessary transmission of repulsive force to the quantization-target pixel adjacent to the text edge region.

In this case, Equation (24) is used instead of Equation (23), since the value of s differs among pixels. In Equation (24), s(x+i, y) indicates a value of s of a pixel (x+i, y).

$$RVu(x, y) = \max(RVc(x + n, y) - 1) \qquad \text{Equation (24)}$$
when $n = 1$; and $$RVu(x, y) = \max\left(RVc(x + n, y) - 1 - \sum_{i=1}^{n-1} s(x + 1, y)\right)$$
when $1 < n \leq 14$ Embodiment 3

Still another embodiment of the present invention is described below. For convenience, components having the same function as in embodiments above are indicated with the same reference numerals and explanations of the components are omitted.

Figure 10:
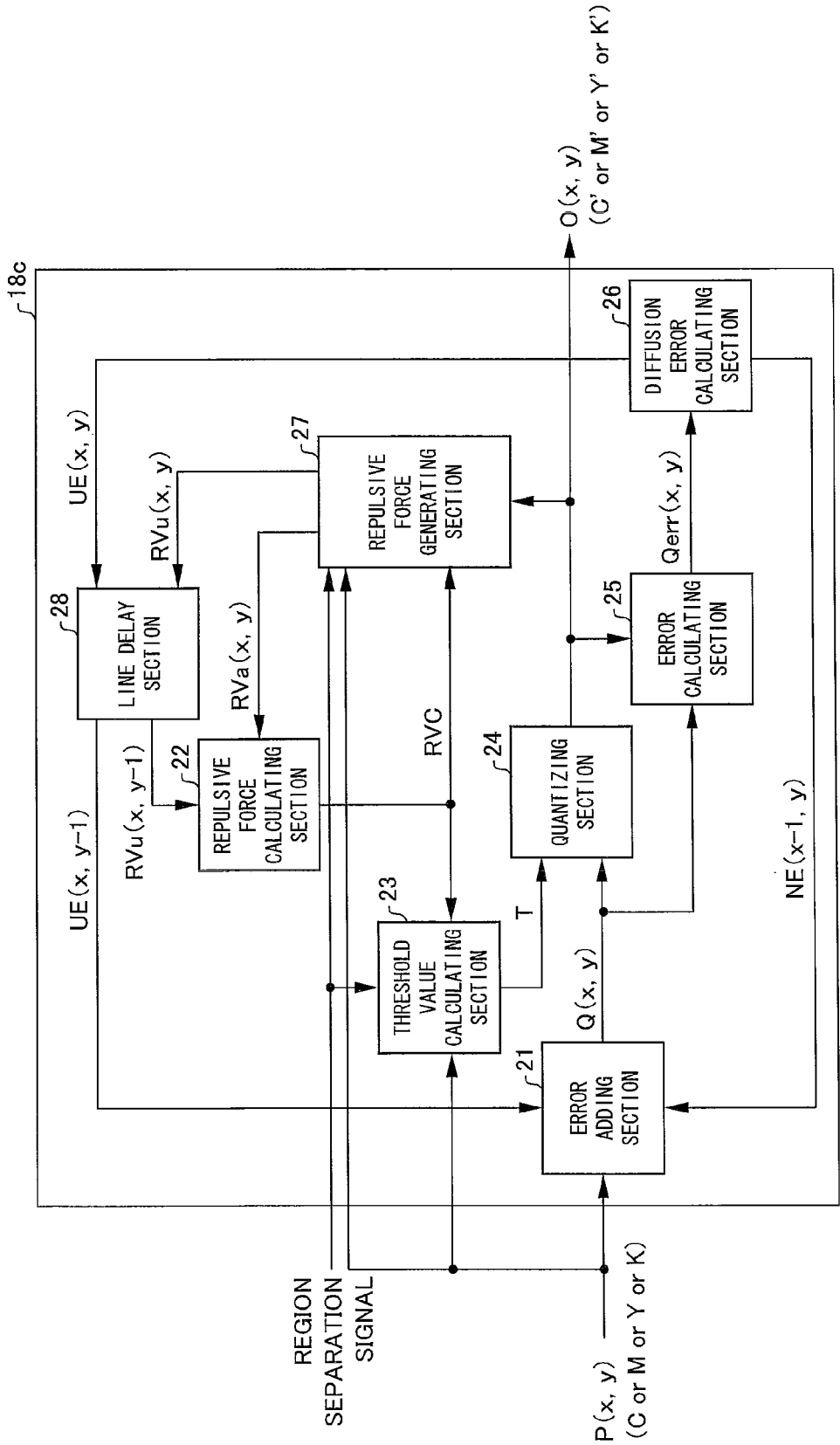
FIG. 10 is a block diagram illustrating an arrangement of a halftone output processing section provided in an image processing apparatus in accordance with still another embodiment of the present invention.

FIG. 10 is a block diagram illustrating an arrangement of a halftone output processing section 18c in accordance with the present embodiment. The halftone output processing section 18c can be provided instead of the halftone output processing section 18b in the digital copying machine 1b described in Embodiment 2.

As shown in FIG. 10, the halftone output processing section 18c differs from the halftone output processing section 18b in that an input pixel value P(x, y) is supplied not only to an error adding section 21 but also to a threshold value calculating section 23 and a repulsive force generating section 27.

The threshold value calculating section 23 calculates a threshold value T by using Equation (11c) instead of Equation (11) so that the input pixel value P(x, y) is reflected in the threshold value:

$$T=128+\alpha\times RVC\times ft(P(x,y)) \qquad \text{Equation (11c)}.$$

In Equation (11c), ft(P(x, y)) is a function whose value varies from 0.0 to 1.0 in response to the input pixel value (P(x, y)).

Figure 11:
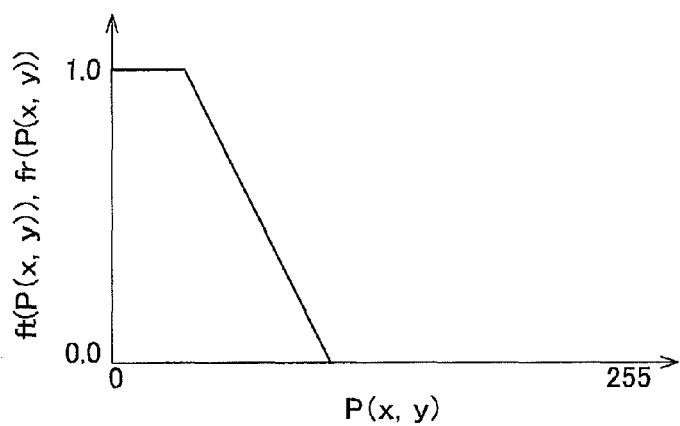
FIG. 11 is a graph showing each characteristic of functions ft(P(x, y)) and fr(P(x, y)) used in the halftone output processing section shown in FIG. 10.

For example, as shown in FIG. 11, the value of ft (P(x, y)) is 1.0 when the input pixel value is low (low-density region), and continuously decreases while the input pixel value increases in a middle-density region, and becomes 0.0 when the input pixel value becomes more than a certain value (high-density region). The function ft (P(x, y)) has different optimal values according to visibility of output dot, which visibility depends on a characteristic of an image output apparatus 4. By outputting a number of image samples, the optimal value of the function ft(P(x, y)) can be appropriately set so that a pattern unique to error diffusion becomes difficult to see.

The repulsive force generating section 27 uses Equation (20c) instead of Equation (20b) when O(x, y)=1:

$$RVa(x,y)=RVc(x,y)=15\times\beta\times fr(P(x,y))\qquad\text{Equation (20c)}.$$

In Equation (20c), fr(P(x, y)) is a function whose value varies from 0.0 to 1.0 in response to the input pixel value (P(x, y)) like the function ft(P(x, y)). For example, as shown in FIG. 11, the value of fr(P(x, y)) is 1.0 when the input pixel value is low (low-density region), and continuously decreases while the input pixel value increases in a middle-density region, and becomes 0.0 when the input pixel value becomes more than a certain value (high-density region). The function fr(P(x, y)) has different optimal values according to visibility of output dot, which visibility depends on the characteristic of the image output apparatus 4. By outputting a number of image samples, the optimal value of the function fr(P(x, y)) can be appropriately set so that a pattern unique to error diffusion becomes difficult to see. FIG. 11 shows an example of a case where fr(P(x, y))=ft(P(x, y)). However, the present invention is not limited to this.

As described above, in the present embodiment, the threshold value T and the repulsive force values RVa(x, y) and RVc(x, y) are calculated by using the functions ft(P(x, y)) and fr(P(x, y)) of the input pixel value P(x, y), each of which is 1.0 when the input pixel value is low (low-density region), and continuously decreases while the input pixel value increases in a middle-density region, and becomes 0.0 when the input pixel value becomes more than a certain value (high-density region).

Accordingly, an effect of the repulsive force becomes large when the input pixel value is low (low-density region), gradually decreases while the input pixel value increases in the middle-density region, and becomes small in the high-density region. This makes it possible to prevent a dispersion of output dots.

Generally, the pattern unique to error diffusion as shown in FIG. 7(*a*) is easy to see particularly in the low-density region where output dots are sparsely distributed, and is difficult to see in the high-density region. Therefore, by suppressing the dispersion of output dots in regions other than the low-density region, it is possible to reduce (i) blurring of edge in the high-density region, caused by the dispersion of dots on a border between a background region and a high-density halftone dot region that is not judged as a text edge region and (ii) standing out in the high-density region, caused by an absence of output dot formation in the background region in the vicinity of the high-density region.

In each of the embodiments above, each section (each block) of the image processing apparatus 3 provided in the digital copying machine 1 is realized by way of software as executed by a processor such as a CPU. The digital copying machine 1 includes a CPU (central processing unit) and memory apparatuses (memory media). The CPU (central processing unit) executes instructions of a control program realizing the functions. The memory apparatuses include a ROM (read only memory) which contains programs, a RAM (random access memory) to which the programs are loaded, and a memory containing the programs and various data. The object of the present invention can be achieved by providing the digital copying machine 1 with a computer-readable storage medium containing control program code (executable program, intermediate code program, or source program) for the digital copying machine 1, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The digital copying machine 1 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR, mobile telephone network, satellite line, or terrestrial digital network. The present invention encompasses a computer data signal embedded in a carrier wave in which the program code is embodied electronically.

Furthermore, each block of the digital copying machine 1 may be realized by not only software but also hardware logic. Each block of the digital copying machine 1 may be a combination of hardware carrying out some of the processes and the computing means controlling the hardware and executing software for the other processes.

The computer system of the present invention may comprise: an image input apparatus such as a flat bed scanner, a film scanner, and a digital camera; a computer loaded with a predetermined program to execute processes such as the image processing; an image display apparatus, such as a CRT display and a liquid crystal display, for displaying a result of the process by the computer; and an image forming apparatus, such as a printer, for outputting a result of the process by the computer on a paper etc. Furthermore, a network card or a modem may be provided as communication means for connecting a server etc. via a network.

An image processing apparatus of the present invention is an image processing apparatus for scanning each pixel of an input image data in a raster order so as to quantize a multi-valued input pixel signal of said each pixel by using an error diffusion method, the image processing apparatus including: an error adding section for calculating an additional value by adding an input pixel value of a quantization-target pixel to a diffusion error diffused from a quantized pixel; a quantizing section for calculating an output pixel value of the quantization-target pixel by quantizing the quantization-target pixel based on a result of comparison between the additional value and a threshold value; an error calculating section for calculating a quantization error based on the input pixel value, the additional value, and the output pixel value obtained by the quantization of the quantization-target pixel; a diffusion error calculating section for calculating a diffusion error to be diffused to a non-quantized pixel based on the quantization error and a positional relation between the quantization-target pixel and the non-quantized pixel; an adjustment standard value generating section for setting an adjustment standard value for every quantization-target pixel according to the output pixel value of the quantization-target pixel, the adjustment standard value providing a standard of correction of the additional value or the threshold value at a time of quantization of the non-quantized pixel; an adjustment value calculating section for calculating an adjustment value to be used in quantizing the quantization-target pixel, the adjustment value calculating section calculating the adjustment value by attenuating, according to a distance between the quantized pixel and the quantization-target pixel, the adjustment standard value set for the quantized pixel; and a threshold value correcting section for correcting, based on the adjustment value, the threshold value or the additional value used in quantizing the quantization-target pixel.

An image processing method of the present invention is an image processing method for scanning each pixel of an input image data in a raster order so as to quantize a multi-valued input pixel signal of said each pixel by using an error diffusion method, the image processing method including: the error adding step for calculating an additional value by adding an input pixel value of a quantization-target pixel to a diffusion error diffused from a quantized pixel; the quantizing step for calculating an output pixel value of the quantization-target pixel by quantizing the quantization-target pixel based on a result of comparison between the additional value and a threshold value; the error calculating step for calculating a quantization error based on the input pixel value, the additional value, and the output pixel value obtained by the quantization of the quantization-target pixel; the diffusion error calculating step for calculating a diffusion error to be diffused to a non-quantized pixel based on the quantization error and a positional relation between the quantization-target pixel and the non-quantized pixel; the adjustment standard value generating step for setting an adjustment standard value for every quantization-target pixel according to the output pixel value of the quantization-target pixel, the adjustment standard value providing a standard of correction of the additional value or the threshold value at a time of quantization of the non-quantized pixel; the adjustment value calculating step for calculating an adjustment value to be used in quantizing the quantization-target pixel, the adjustment value calculating section calculating the adjustment value by attenuating, according to a distance between the quantized pixel and the quantization-target pixel, the adjustment standard value set for the quantized pixel; and the threshold value correcting step for correcting, based on the adjustment value, the threshold value or the additional value used in quantizing the quantization-target pixel.

With the image processing apparatus and the image processing method, the adjustment standard value, which provides a standard of correction of the additional value or the threshold value at a time of quantization of the non-quantized pixel, is set for every quantization-target pixel according to the output pixel value of the quantization-target pixel. Then, the adjustment value to be used in quantizing the quantization-target pixel is calculated by attenuating, according to a distance between the quantized pixel and the quantization-target pixel, the adjustment standard value set for the quantized pixel. The threshold value or the additional value used in quantizing the quantization-target pixel is corrected based on the adjustment value thus calculated.

By this, a neighboring pixel of a pixel having a great output pixel value can be prevented, according to a distance between these pixels, from increasing in output pixel value. Therefore, it is possible to prevent a pattern unique to the error diffusion method from being formed in an output image by preventing output dots from being formed adjacent to each other. It is also possible to prevent decrease in image uniformity. Further, it is possible to reduce an amount of processing by significantly reducing the number of processing steps from the technique of Patent Literature 2, because the present invention only requires (i) calculating the adjustment standard value of a quantized pixel according to an output pixel value of the quantized pixel, (ii) calculating the adjustment value at a time of quantization of a non-quantized pixel according to the adjustment standard value of the quantized pixel and a distance between the quantized pixel and the non-quantized pixel, and (iii) correcting the threshold value or the additional value based on the adjustment value.

The image processing apparatus may be arranged so as to further include: a segmentation process section for judging an image type of a region to which the quantization-target pixel belongs, the adjustment standard value generating section correcting the adjustment standard value of the quantization-target pixel according to the image type of the region to which the quantization-target pixel belongs.

With the arrangement, which includes correcting the adjustment standard value of the quantization-target pixel according to the image type of the quantization-target pixel, it is possible to adjust an image characteristic according to the image type of a region to which the quantization-target pixel belongs.

The image processing apparatus may be arranged so that: the segmentation process section judges whether the quantization-target pixel belongs to a text edge region, which constitute a text or a line; and when the quantization-target pixel is judged as belonging to the text edge region, the adjustment standard value generating section sets the adjustment standard value of the quantization-target pixel smaller than in a case where the quantization-target pixel is judged as belonging to a region other than the text edge region.

With the arrangement, it is possible to suppress the dispersion of output dots in the vicinity of edge of text or line. Further, it is possible to prevent a text edge from standing out by dispersing the output dots in a base material region in the vicinity of the text edge.

The image processing apparatus may be arranged so as to further include: a segmentation process section for judging an image type of a region to which the quantization-target pixel belongs, the adjustment value calculating section changing, according to the image type of the quantization-target pixel, an attenuating amount of the adjustment standard value, which is determined according to the distance between the quantization-target pixel and the quantized pixel.

With the arrangement, which includes changing an attenuating amount of the adjustment standard value according to the image type of the quantization-target pixel, it is possible to prevent a transmission of incorrect standard value from a distantly-positioned pixel that generates the adjustment standard value, even in a case where a text edge region exists between the quantization-target pixel and the distantly-positioned pixel.

The image processing apparatus may be arranged so as to further include: a segmentation process section for judging an image type of a region to which the quantization-target pixel belongs, the threshold value correcting section correcting the threshold value or the additional value according to the adjustment value and the image type of the quantization-target pixel.

With the arrangement, which includes correcting the threshold value or the additional value according to the adjustment value and the image type of the quantization-target pixel, it is possible to adjust an image characteristic according to the image type of a region to which the quantization-target pixel belongs.

The image processing apparatus may be arranged so that: the segmentation process section judges whether the quantization-target pixel belongs to a text edge region, which constitute a text or a line; and when the quantization-target pixel is judged as belonging to the text edge region, the threshold value correcting section corrects (i) the threshold value for the quantization of the quantization-target pixel so that the threshold value becomes greater than in a case where the quantization-target pixel is judged as belonging to a region other than the text edge region, or (ii) the additional value for the quantization of the quantization-target pixel so that the additional value becomes smaller than in a case where the quantization-target pixel is judged as belonging to the region other than the text edge region.

With the arrangement, it is possible to suppress the dispersion of output dots in the vicinity of edge of text or line. Further, it is possible to prevent a text edge from standing out by dispersing the output dots in a base material region in the vicinity of the text edge.

The image processing apparatus may be arranged so that: when the input pixel value of the quantization-target pixel is equal to or more than a predetermined value, the adjustment standard value generating section sets the adjustment standard value of the quantization-target pixel smaller than in a case where the input pixel value is less than the predetermined value.

With the arrangement, it is possible to prevent (i) blurring of edge caused by the dispersion of output dots in a high-density region and (ii) standing out in the high-density region, caused by an absence of output dot formation in the vicinity of the high-density region. Generally, even in a case where the error diffusion method is used, the high-density region is less likely to cause decrease in image uniformity and formation of a pattern unique to the error diffusion method.

The image processing apparatus may be arranged so that: when the input pixel value of the quantization-target pixel is less than a second predetermined value, the adjustment standard value generating section sets the adjustment standard value of the quantization-target pixel greater than in a case where the input pixel value is equal to or more than the second predetermined value.

Generally, the pattern unique to the error diffusion method is easier to see particularly in a low-density region. With the arrangement, it becomes easy for output dots to be dispersed in the low-density region. Therefore, it is possible to more efficiently prevent the formation of the pattern unique to the error diffusion.

The image processing apparatus may be realized by a computer. In this case, the present invention also includes: a program for causing a computer to operate as each of the above sections so as to realize the image processing apparatus by use of the computer; and a computer-readable storage medium in which the program is stored.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image processing apparatus for scanning each pixel of an input image data in a raster order so as to quantize a multi-valued input pixel signal of said each pixel by using an error diffusion method, the image processing apparatus comprising:
    an error adding section for calculating an additional value by adding an input pixel value of a quantization-target pixel to a diffusion error diffused from a quantized pixel;
    a quantizing section for calculating an output pixel value of the quantization-target pixel by quantizing the quantization-target pixel based on a result of comparison between the additional value and a threshold value;
    an error calculating section for calculating a quantization error based on the input pixel value, the additional value, and the output pixel value obtained by the quantization of the quantization-target pixel;
    a diffusion error calculating section for calculating a diffusion error to be diffused to a non-quantized pixel based on the quantization error and a positional relation between the quantization-target pixel and the non-quantized pixel;
    an adjustment standard value generating section for setting an adjustment standard value for every quantization-target pixel according to the output pixel value of the quantization-target pixel, the adjustment standard value providing a standard of correction of the additional value or the threshold value at a time of quantization of the non-quantized pixel;
    an adjustment value calculating section for calculating an adjustment value to be used in quantizing the quantization-target pixel, the adjustment value calculating section calculating the adjustment value by attenuating, according to a distance between the quantized pixel and the quantization-target pixel, the adjustment standard value set for the quantized pixel; and
    a threshold value correcting section for correcting, based on the adjustment value, the threshold value or the additional value used in quantizing the quantization-target pixel.

2. The image processing apparatus according to claim 1 further comprising:
    a segmentation process section for judging an image type of a region to which the quantization-target pixel belongs,
    the adjustment standard value generating section correcting the adjustment standard value of the quantization-target pixel according to the image type of the region to which the quantization-target pixel belongs.

3. The image processing apparatus according to claim 2, wherein:
    the segmentation process section judges whether the quantization-target pixel belongs to a text edge region, which constitute a text or a line; and
    when the quantization-target pixel is judged as belonging to the text edge region, the adjustment standard value generating section sets the adjustment standard value of the quantization-target pixel smaller than in a case where the quantization-target pixel is judged as belonging to a region other than the text edge region.

4. The image processing apparatus according to claim 1 further comprising:

a segmentation process section for judging an image type of a region to which the quantization-target pixel belongs, the adjustment value calculating section changing, according to the image type of the quantization-target pixel, an attenuating amount of the adjustment standard value, which is determined according to the distance between the quantization-target pixel and the quantized pixel.

5. The image processing apparatus according to claim 1 further comprising:

a segmentation process section for judging an image type of a region to which the quantization-target pixel belongs, the threshold value correcting section correcting the threshold value or the additional value according to the adjustment value and the image type of the quantization-target pixel.

6. The image processing apparatus according to claim 5, wherein:

the segmentation process section judges whether the quantization-target pixel belongs to a text edge region, which constitute a text or a line; and when the quantization-target pixel is judged as belonging to the text edge region, the threshold value correcting section corrects (i) the threshold value for the quantization of the quantization-target pixel so that the threshold value becomes greater than in a case where the quantization-target pixel is judged as belonging to a region other than the text edge region, or (ii) the additional value for the quantization of the quantization-target pixel so that the additional value becomes smaller than in a case where the quantization-target pixel is judged as belonging to the region other than the text edge region.

7. The image processing apparatus according to claim 1, wherein:

when the input pixel value of the quantization-target pixel is equal to or more than a predetermined value, the adjustment standard value generating section sets the adjustment standard value of the quantization-target pixel smaller than in a case where the input pixel value is less than the predetermined value.

8. The image processing apparatus according to claim 1, wherein:

when the input pixel value of the quantization-target pixel is less than a second predetermined value, the adjustment standard value generating section sets the adjustment standard value of the quantization-target pixel greater than in a case where the input pixel value is equal to or more than the second predetermined value.

9. An image forming apparatus comprising:

an image processing apparatus according to claim 1; and an image forming section for forming, on a recording material, an image corresponding to image data that is quantized by the image processing apparatus.

10. An image processing method for scanning each pixel of an input image data in a raster order so as to quantize a multi-valued input pixel signal of said each pixel by using an error diffusion method, the image processing method comprising:

an error adding step for calculating an additional value by adding an input pixel value of a quantization-target pixel to a diffusion error diffused from a quantized pixel;

a quantizing step for calculating an output pixel value of the quantization-target pixel by quantizing the quantization-target pixel based on a result of comparison between the additional value and a threshold value;

an error calculating step for calculating a quantization error based on the input pixel value, the additional value, and the output pixel value obtained by the quantization of the quantization-target pixel;

a diffusion error calculating step for calculating a diffusion error to be diffused to a non-quantized pixel based on the quantization error and a positional relation between the quantization-target pixel and the non-quantized pixel;

an adjustment standard value generating step for setting an adjustment standard value for every quantization-target pixel according to the output pixel value of the quantization-target pixel, the adjustment standard value providing a standard of correction of the additional value or the threshold value at a time of quantization of the non-quantized pixel;

an adjustment value calculating step for calculating an adjustment value to be used in quantizing the quantization-target pixel, the adjustment value calculating section calculating the adjustment value by attenuating, according to a distance between the quantized pixel and the quantization-target pixel, the adjustment standard value set for the quantized pixel; and a threshold value correcting step for correcting, based on the adjustment value, the threshold value or the additional value used in quantizing the quantization-target pixel.

11. A non-transitory computer-readable storage medium, in which a program for causing an image processing apparatus according to claim 1 to operate is stored, the program causing a computer to function as each section of the image processing apparatus.

* * * * *